US007738541B2

(12) United States Patent
Duvaut et al.

(10) Patent No.: US 7,738,541 B2
(45) Date of Patent: Jun. 15, 2010

(54) ENHANCED SMART DSL SYSTEMS FOR LDSL

(75) Inventors: Patrick Duvaut, Tinton Falls, NJ (US); Lujing Cai, Morganville, NJ (US); Massimo Sorbara, Freehold, NJ (US)

(73) Assignee: Ikanos Communications, Inc., Fremont, CA (US)

(*) Notice: Subject to any disclaimer, the term of this patent is extended or adjusted under 35 U.S.C. 154(b) by 1926 days.

(21) Appl. No.: 10/714,660

(22) Filed: Nov. 18, 2003

(65) Prior Publication Data

US 2004/0202240 A1 Oct. 14, 2004

Related U.S. Application Data

(60) Provisional application No. 60/488,804, filed on Jul. 22, 2003, provisional application No. 60/426,796, filed on Nov. 18, 2002.

(51) Int. Cl.
H04B 1/38 (2006.01)
H04L 5/16 (2006.01)
(52) U.S. Cl. .................................. 375/222; 375/220
(58) Field of Classification Search ........... 375/222, 375/220
See application file for complete search history.

(56) References Cited

U.S. PATENT DOCUMENTS

| 6,333,920 | B1 | 12/2001 | Nguyen et al. |
| 6,668,041 | B2 * | 12/2003 | Kamali et al. ............ 379/1.04 |
| 6,760,383 | B1 * | 7/2004 | Darveau .................... 375/259 |
| 2004/0218667 | A1 * | 11/2004 | Duvaut et al. ............. 375/224 |
| 2006/0163949 | A1 * | 7/2006 | Barrass ..................... 307/19 |

OTHER PUBLICATIONS

International Search Report dated May 21, 2004 for Application No. PCT/US03/36843.
Kee Bong Song et al., Dynamic spectrum management for next-generation dsl systems, Topics in Broadband Access, IEEE Communications Magazine, Oct. 2002, pp. 101-109.
Feng Ouyang et al., The first step of long-reach adsl:smart dsl technology, readsl, Topics in Broadband Access, IEEE Communications Magazine, Sep. 2003, pp. 124-131.

* cited by examiner

*Primary Examiner*—David C Payne
*Assistant Examiner*—Nader Bolourchi
(74) *Attorney, Agent, or Firm*—Thomas, Kayden, Horstemeyer & Risley, LLP

(57) ABSTRACT

A "Smart DSL System" for addressing the performance objectives of LDSL and examples of smart systems for LDSL are disclosed. In accordance with embodiments of the invention, there is disclosed a method for implementing smart DSL for LDSL systems. Embodiments of the method include presenting a number of spectral masks that are available on the LDSL system, and selecting from the number of spectral masks an upstream mask and a downstream mask wherein the upstream mask and the downstream mask exhibit complimentary features.

13 Claims, 42 Drawing Sheets

Two smart system selection modes: Manual and Automatic

Two options to automatically select a pair of masks in a smart DSL system

"CO decides" sequence based on G.992.3

ENHANCED SMART DSL SYSTEMS FOR LDSL

RELATED APPLICATIONS

The present invention claims priority to U.S. Provisional Application No. 60/488,804 filed Jul. 22, 2003 and 60/426,796 filed Nov. 18, 2002, the contents of which are incorporated herein by reference in their entirety.

This application is related to copending U.S. patent applications titled "SYSTEM AND METHOD FOR SELECTABLE MASK FOR LDSL," Ser. No. 10/714,907 which claims priority to U.S. Provisional Patent Application No. 60/441,351, "ENHANCED SMART DSL FOR LDSL," which claims priority to U.S. Provisional Application No. 60/488,804 filed Jul. 22, 2003 and "POWER SPECTRAL DENSITY MASKS FOR IMPROVED SPECTRAL COMPATIBILITY" which claims priority to U.S. Provisional Application No. 60/491,268 filed Jul. 31, 2003, all filed concurrently herewith.

BACKGROUND OF THE INVENTION

1. Field of the Invention

This invention relates to digital subscriber lines (DSL) and to smart systems for implementing Long reach Digital Subscriber Lines (LDSL).

2. Description of Related Art

High level procedures for meeting stated objectives for Long reach Digital Subscriber Line (LDSL) transmissions are disclosed. Some objectives for LDSL have been defined in publications available from standards organizations such as the International Telecommunications Union (ITU). For example, ITU publications OC-041R1, OC-045, OC-073R1, OJ-030, OJ-036, OJ-060, OJ-061, OJ-062, OJ-200R1, OJ-200R2, OJ-201, OJ-60R1, OJ-60R2 and OJ-210 set forth some LDSL objectives. Other objectives, standards and criteria for LDSL are also possible and may be accommodated by the disclosed inventions.

One LDSL target objective is to achieve a minimum payload transmission of 192 kb/s downstream and 96 kb/s upstream on loops having an equivalent working length of 18 kft 26 gauge cable in a variety of loop and noise conditions. One difficulty in achieving these target transmission rates is the occurrence of crosstalk noise.

The crosstalk noise environments that may occur for the above bit rate target objective are varied. For example, noise environments may include Near-end cross talk (NEXT), Far-end cross talk (FEXT), disturbance from Integrated Services Digital Networks (ISDN), High Speed Digital Subscriber Lines (HDSL), Single-pair High Speed Digital Subscriber Line (SHDSL), T1, and Self-disturbers at both the Central Office (CO) and Customer Premise Equipment (CPE) ends. NEXT from HDSL and SHDSL tend to limit the performance in the upstream channel, while NEXT from repeatered T1 Alternate Mark Inversion (AMI) systems tend to severely limit the downstream channel performance. An additional source of noise is loops containing bridged taps that degrade performance on an Asymmetric Digital Subscriber Line (ADSL) downstream channel more so than the upstream channel.

Another drawback of existing systems is that it appears very difficult to determine a single pair of Upstream and Downstream masks that will maximize the performance against any noise-loop field scenario, while ensuring spectral compatibility and, at the same time, keeping a desirable balance between Upstream and Downstream rates.

One approach for LDSL relies on different Upstream and Downstream masks exhibiting complementary features. Realistically, all these chosen masks are available on any LDSL Platform. At the modem start up, based on a certain protocol, the best Upstream-Downstream pair of masks is picked up. Whether the best pair is manually chosen at the discretion of the operator, or automatically selected, this concept is identified as "smart DSL for LDSL".

There are many reasons to implement smart DSL. For example, non-smart DSL systems may implement a single mask for upstream and downstream transmissions. A drawback with this approach is that the use of a single mask may prevent LDSL service in areas of the United States dominated by T1 noise.

In addition, the use of a single mask is a drawback because the existence of other spectrally compatible masks cannot be ruled out. LDSL service providers will want to have access to an array of mask/tools provided they are spectrally compatible. Service providers may decide to use only one mask according to the physical layer conditions, or any combination of masks for the same or other reasons.

Another advantage of Smart DSL is that it is a good way to handle providing LDSL services in different countries. For example, so far, LDSL work has focused on Southwestern Bell (SBC) requirements. As a result, it is risky of, for example, a US-based LDSL provider to rely on the ability to apply any masks that pass SBC tests to Europe, China or Korea. LDSL is a difficult project and essential for all the countries. Therefore, any scheme for LDSL standardization that takes into account merely SBC physical layer and cross talk requirements may jeopardize the ADSL reach extension in non-standard LDSL countries. Other drawbacks of current systems also exist.

SUMMARY OF THE INVENTION

A "Smart DSL System" for addressing the performance objectives of LDSL and examples of smart systems for LDSL are disclosed.

In accordance with embodiments of the invention, there is disclosed a method for implementing smart DSL for LDSL systems. Embodiments of the method may comprise presenting a number of spectral masks that are available on the LDSL system, and selecting from the number of spectral masks an upstream mask and a downstream mask wherein the upstream mask and the downstream mask exhibit complimentary features.

In some embodiments the method may further comprise selecting the upstream mask and the downstream mask during a modem start up period. Still further, embodiments of the invention may comprise selecting the upstream mask and the downstream mask manually or automatically.

In accordance with some embodiments of the invention, there is disclosed a method for implementing smart DSL for LDSL systems. In some embodiments, the method may comprise defining a candidate system to be implemented by an LDSL system, optimizing criteria associated with the candidate system, and selecting a candidate system to implement in an LDSL system.

In accordance with some embodiments of the invention, the method may further comprise determining features of upstream and downstream transmission. The method may further comprise determining one or more of: cut-off frequencies, side lobe shapes, overlap, partial overlap or Frequency-Division Duplexing (FDD) characteristics.

In some embodiments, the method may further comprise optimizing criteria associated with the candidate system to fulfill upstream and downstream performance targets and selecting a spectral mask for use with upstream or downstream transmission.

In accordance with some embodiments of the invention there is provided a method for implementing smart DSL for LDSL systems. In some embodiments the method may comprise selecting a spectral mask based upon performance criteria; and activating the selected spectral mask based at least one of customer premise or central office capabilities.

In accordance with further aspects of the invention, the method may further comprise selecting the spectral mask is performed manually or automatically. Other advantages and features of the invention are discussed below.

DETAILED DESCRIPTION OF PREFERRED EMBODIMENTS

Smart DSL Concept for LDSL.

Figure 41:
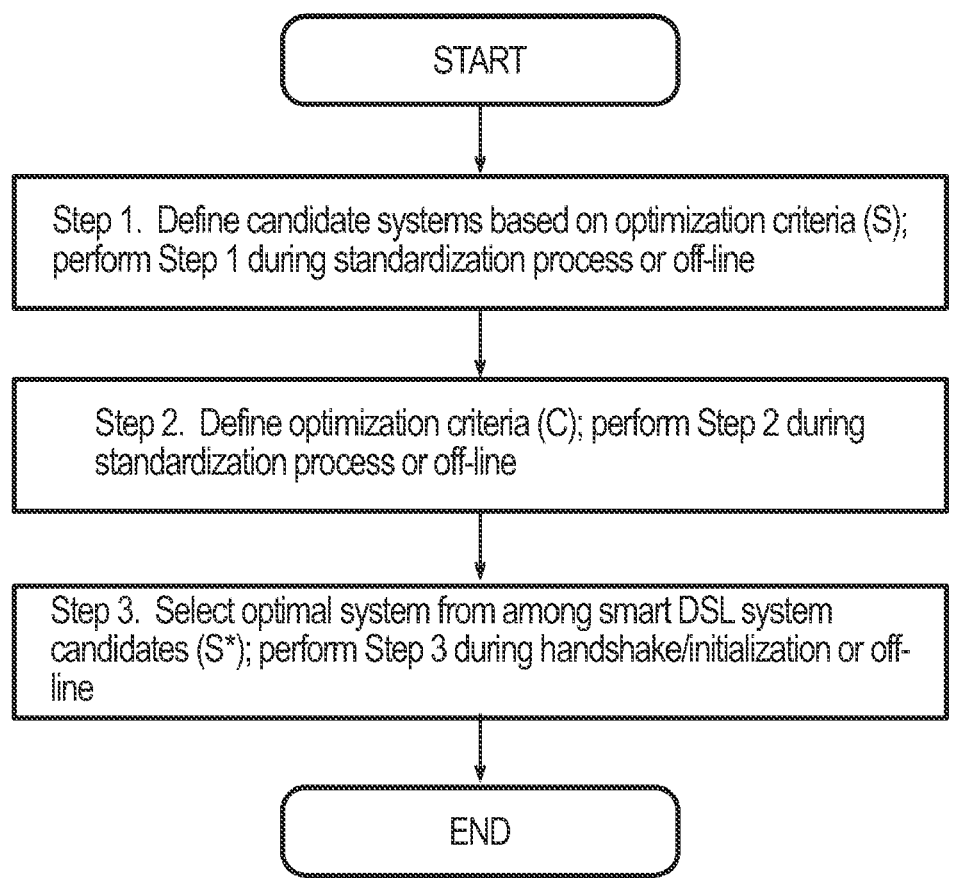
FIG. 41 illustrates a flow diagram for implementing smart DSL systems in accordance with one embodiment.

This section defines a Smart DSL concept for LDSL. With reference to FIG. 41, in some embodiments, operating with smart DSL systems for LDSL may include the below listed steps. The first and second steps may be completed, in some embodiments, during a standardization process and other steps may be performed during a modem's handshake/initialization phase in order to optimize the performance for any type of loops and noises.

Step 1. Smart DSL Systems members for LDSL (S).

In some embodiments it is preferable to complete step 1 during standardization processes. Alternatively, step 1 may be performed off line, for example, if no standardization is at stake.

In some embodiments, the first step consists of defining candidate systems that aim to be picked up based on optimization criteria defined below. Typically, these candidate systems may exhibit sufficient versatility features for both Upstream and Downstream spectra, such as cut off frequencies, side lobes shapes, overlap, partial overlap, FDD characteristics, etc.

In some embodiments it may be desirable for candidate systems to also meet additional constraints. For example, an additional constraint may be that no new channel coding scheme should be considered in the candidate systems. In this manner, smart DSL systems in accordance with the invention exhibit several degrees of freedom that are summarized in what follows by parameter set S.

Step 2. Optimization criteria (C).

In some embodiments, it is preferable that the second step be completed during the standardization process. Alternatively, the second step may be completed off line if no standardization is at stake.

The second step comprises defining optimization criteria. Optimization criteria drive smart DSL systems members definition and, of course, the performance outcomes. For some embodiments, optimization criteria (C) may be summarized as covering Upstream and Downstream performance targets. In addition, optimization criteria may cover the margin within which performance targets should be met, such as, whether the deployment is Upstream or Downstream limited. The last point is important since often, in order to keep the optimization process simple priority should be given to Upstream or Downstream channels.

In some embodiments, optimization criteria may also comprise spectral compatibility requirements. This criteria may also include assumptions about neighboring services. Other optimization criteria are also possible.

Step 3. Choice of an optimal system amongst the smart DSL systems candidates (S*).

In some embodiments it may be preferable to complete step 3 during handshake/initialization. Completing step 3 during handshake/initialization may enable better handling of any type of loops and noise/cross talk conditions. Alternatively, this step could be completed off line, for example, if the operator has accurate prior knowledge of loops and noise conditions.

In some embodiments, completion of step 3 may be as simple as picking up one of two masks already defined. In other embodiments, completion of step 3 may comprise tuning a continuous parameter such as a cut off frequency. Other methods of completing step 3 are also possible.

In some embodiments, the outcome of step 3 may comprise an optimal system (S*) that will be run by the modem in the conditions that lead to its optimality.

Two Examples of Smart DSL system for LDSL, based on SBC requirements.

Example 1: Definition of the Masks to be used in the two smart systems.

Figure 1:
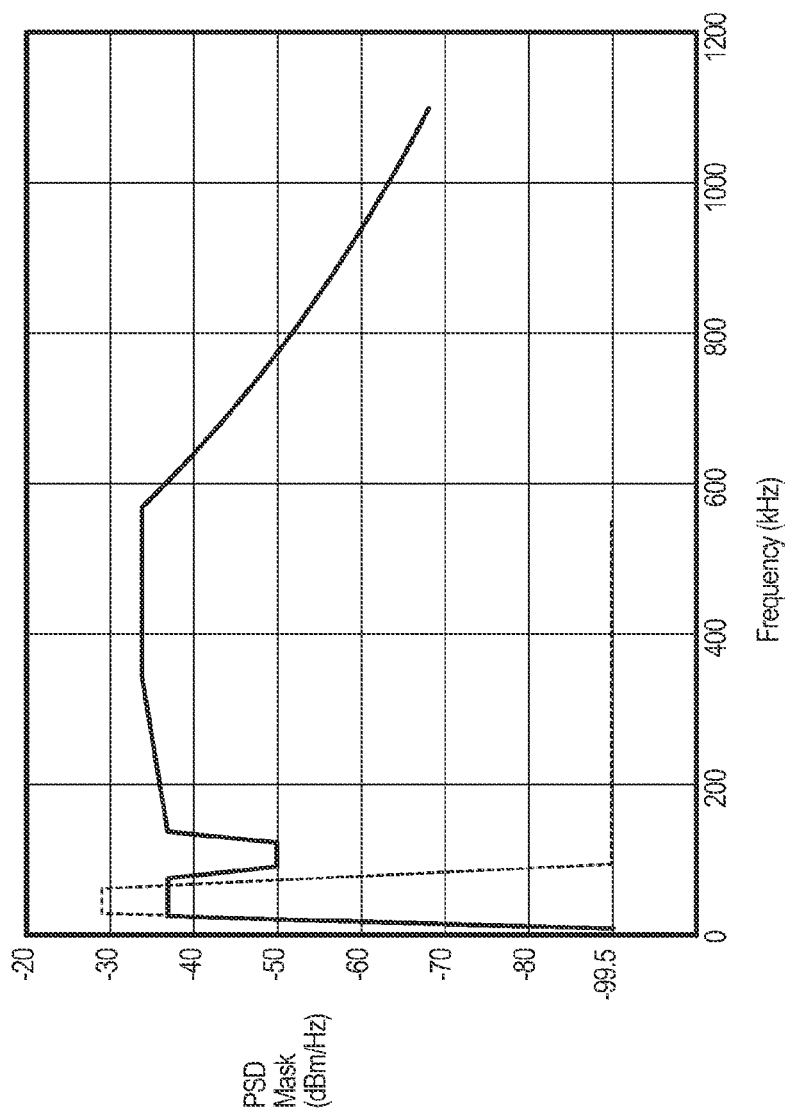
FIG. 1 is a graph illustrating peak values for U1 and D1 PSD masks according to embodiments of the invention.

Three Upstream masks U1, U2, U3 and three Downstream masks D1, D2, D3 are used in what follows to define embodiments of smart systems. U1(dashed line) and D1 (solid line) masks are plotted in FIG. 1. Note that in this section the masks for peak values are defined. As defined by some standards, the PSD templates, or average PSD values, are 3.5 dB lower than the mask values. Tables 1 and 2 show some values for U1 and D1 (respectively) according to some embodiments of the invention.

TABLE 1

U1 PSD Mask Definition, peak values

| Frequency Band f (kHz) | Equation for the PSD mask (dBm/Hz) |
|---|---|
| $0 < f \leq 4$ | −97.5, with max power in the in 0-4 kHz band of +15 dBm |
| $4 < f \leq 25.875$ | $-92.5 + 23.43 \times \log_2(f/4)$; |
| $25.875 < f \leq 60.375$ | −29.0 |
| $60.375 < f \leq 90.5$ | $-34.5 - 95 \times \log_2(f/60.375)$ |
| $90.5 < f \leq 1221$ | −90 |
| $1221 < f \leq 1630$ | −99.5 peak, with max power in the [f, f + 1 MHz] window of $(-90 - 48 \times \log_2(f/1221) + 60)$ dBm |
| $1630 < f \leq 11040$ | −99.5 peak, with max power in the [f, f + 1 MHz] window of −50 dBm |

TABLE 2

D1 PSD Mask Definition, peak values

| Frequency Band f (kHz) | Equation for the PSD mask (dBm/Hz) |
|---|---|
| $0 < f \leq 4$ | −97.5, with max power in the in 0-4 kHz band of +15 dBm |
| $4 < f \leq 25.875$ | $-92.5 + 20.79 \times \log_2(f/4)$ |
| $25.875 < f \leq 81$ | −36.5 |
| $81 < f \leq 92.1$ | $-36.5 - 70 \times \log_2(f/81)$ |
| $92.1 < f \leq 121.4$ | −49.5 |
| $121.4 < f \leq 138$ | $-49.5 + 70 \times \log_2(f/121.4)$ |
| $138 < f \leq 353.625$ | $-36.5 + 0.0139 \times (f - 138)$ |
| $353.625 < f \leq 569.25$ | −33.5 |
| $569.25 < f \leq 1622.5$ | $-33.5 - 36 \times \log_2(f/569.25)$ |
| $1622.5 < f \leq 3093$ | −90 |
| $3093 < f \leq 4545$ | −90 peak, with maximum power in the [f, f + 1 MHz] window of $(-36.5 - 36 \times \log_2(f/1104) + 60)$dBm |
| $4545 < f \leq 11040$ | −90 peak, with maximum power in the [f, f + 1 MHz] window of −50 dBm |

Figure 2:
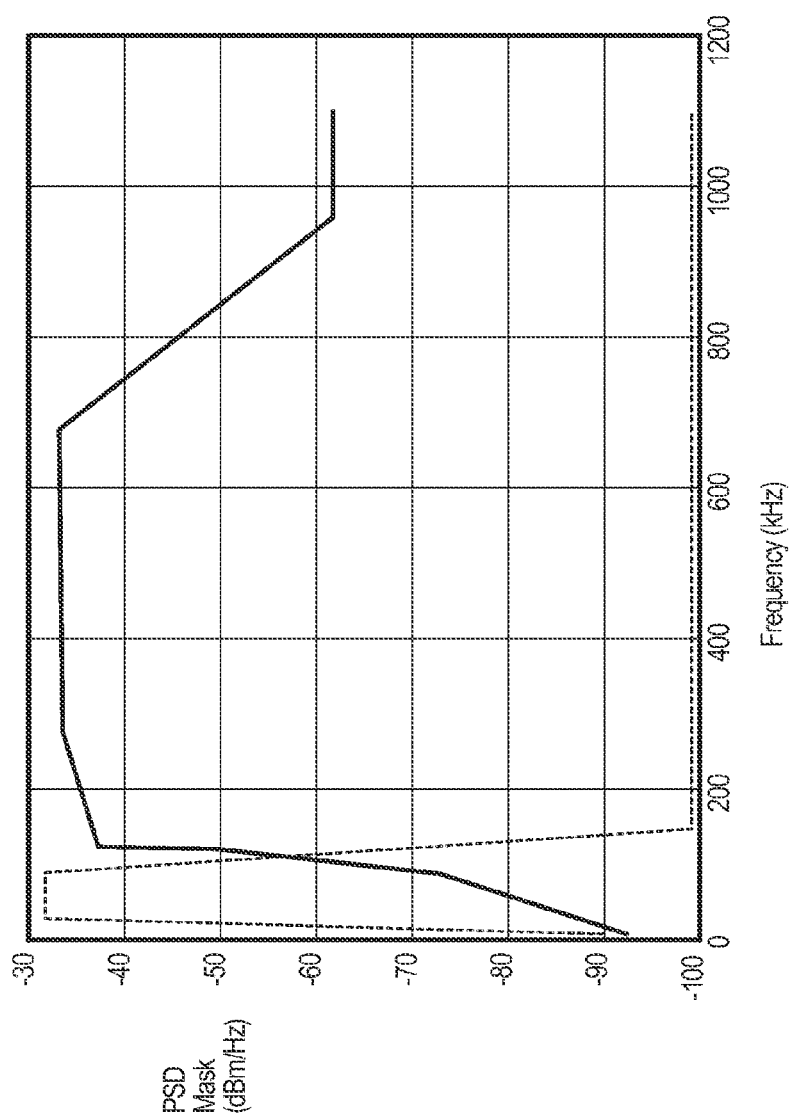
FIG. 2 is a graph illustrating peak values for U2 and D2 PSD masks according to embodiments of the invention.

According to some embodiments of the invention U2 (dashed line) and D2 (solid line) spectrum masks may be plotted as shown in FIG. 2. Note that, as above, the masks for peak values are defined. The PSD templates, or average PSD values, are 3.5 dB lower than the mask values. Tables 3 and 4 show some values for U2 and D2 (respectively) in accordance with some embodiments of the invention.

TABLE 3

U2 Mask Definition, peak values

| Frequency Band f (kHz) | Equation for the PSD mask (dBm/Hz) |
|---|---|
| $0 < f \leq 4$ | −97.5, with max power in the in 0-4 kHz band of +15 dBm |
| $4 < f \leq 25.875$ | $-92.5 - 22.5 \times \log_2(f/4)$; |
| $25.875 < f \leq 86.25$ | −30.9 |
| $86.25 < f \leq 138.6$ | $-34.5 - 95 \times \log_2(f/86.25)$ |
| $138.6 < f \leq 1221$ | −99.5 |
| $1221 < f \leq 1630$ | −99.5 peak, with max power in the [f, f + 1 MHz] window of $(-90 - 48 \times \log_2(f/1221) + 60)$ dBm |
| $1630 < f \leq 11040$ | −99.5 peak, with max power in the [f, f + 1 MHz] window of −50 dBm |

TABLE 4

D2 Mask Definition, peak values

| Starting Frequency (kHz) | Starting PSD mask value (dBm/Hz) |
|---|---|
| 0.000000 | −98.000000 |
| 3.990000 | −98.000000 |
| 4.000000 | −92.500000 |
| 80.000000 | −72.500000 |
| 120.740000 | −47.500000 |
| 120.750000 | −37.800000 |
| 138.000000 | −36.800000 |
| 276.000000 | −33.500000 |
| 677.062500 | −33.500000 |
| 956.000000 | −62.000000 |
| 1800.000000 | −62.000000 |
| 2290.000000 | −90.000000 |
| 3093.000000 | −90.000000 |
| 4545.000000 | −110.000000 |
| 12000.000000 | −110.000000 |

Figure 3:
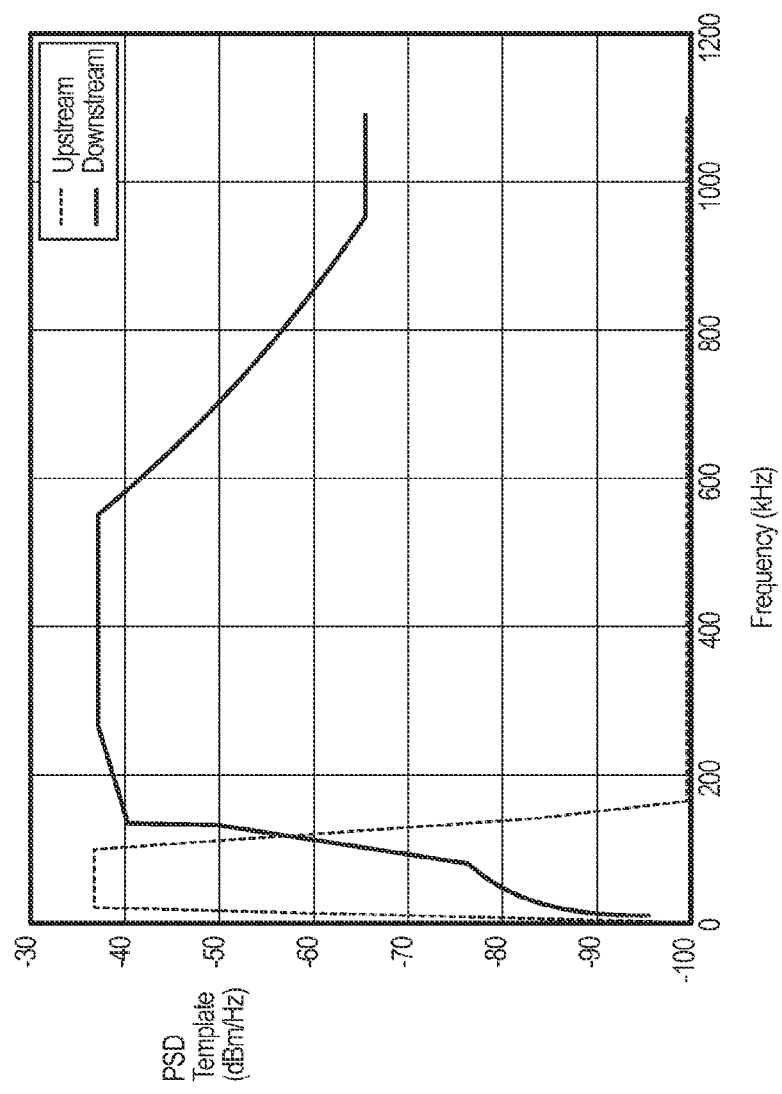
FIG. 3 is a graph illustrating average values for U3 and D3 PSD templates according to embodiments of the invention.
Figure 4:
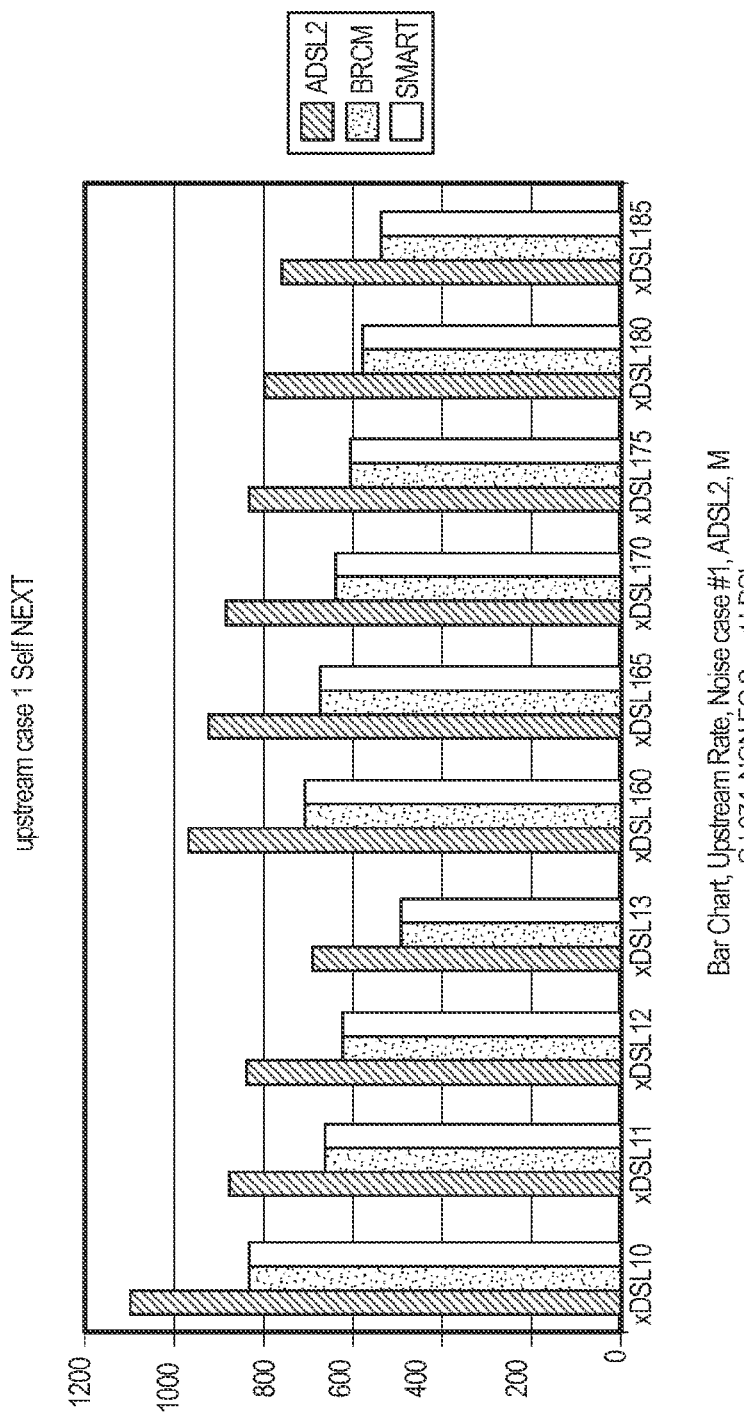
FIG. 4 is a bar chart illustrating upstream rate, noise case #1, for ADSL2, M OJ-074, NON EC Smart LDSL systems in accordance with embodiments of the invention.
Figure 5:
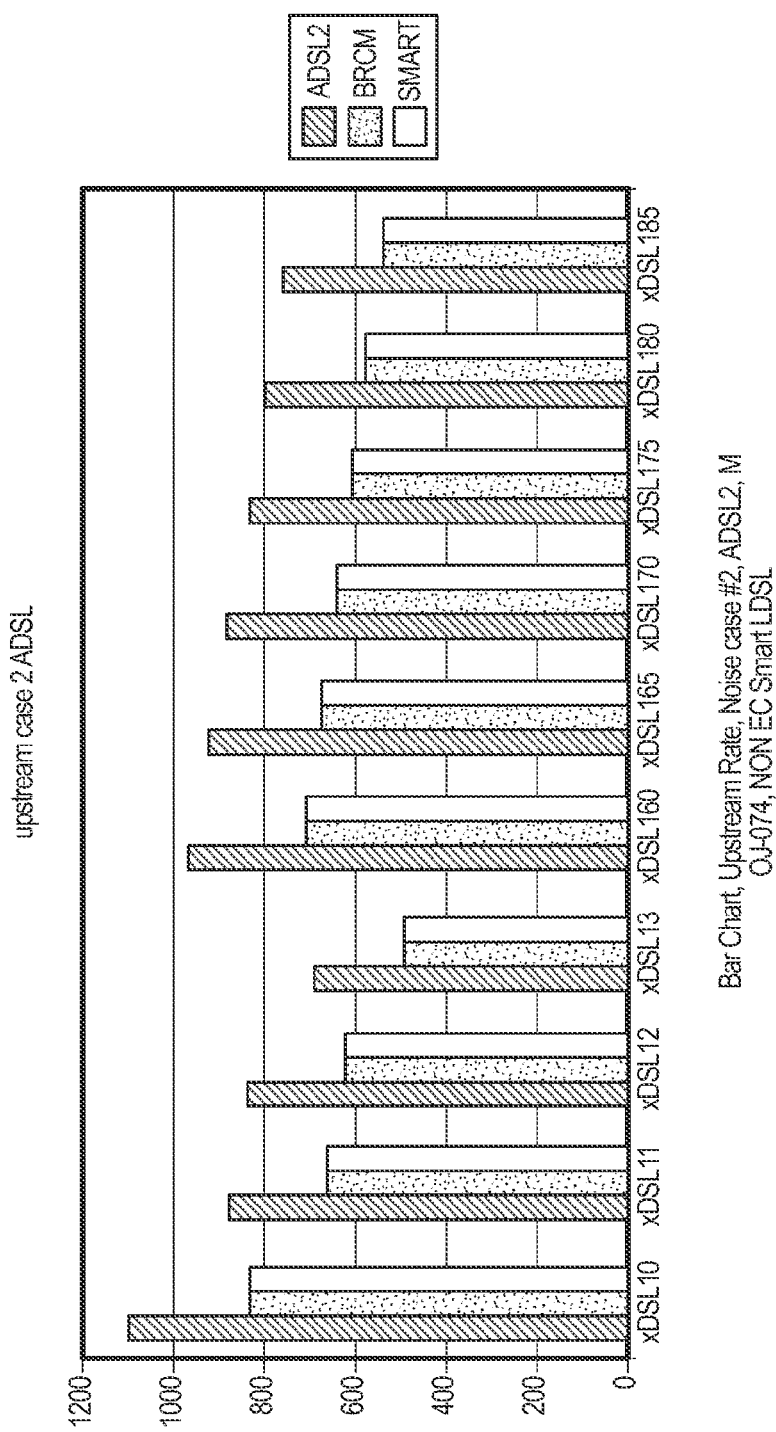
FIG. 5 is a bar chart illustrating upstream rate, noise case #2, ADSL2, M OJ-074, NON EC Smart LDSL systems in accordance with embodiments of the invention.
Figure 6:
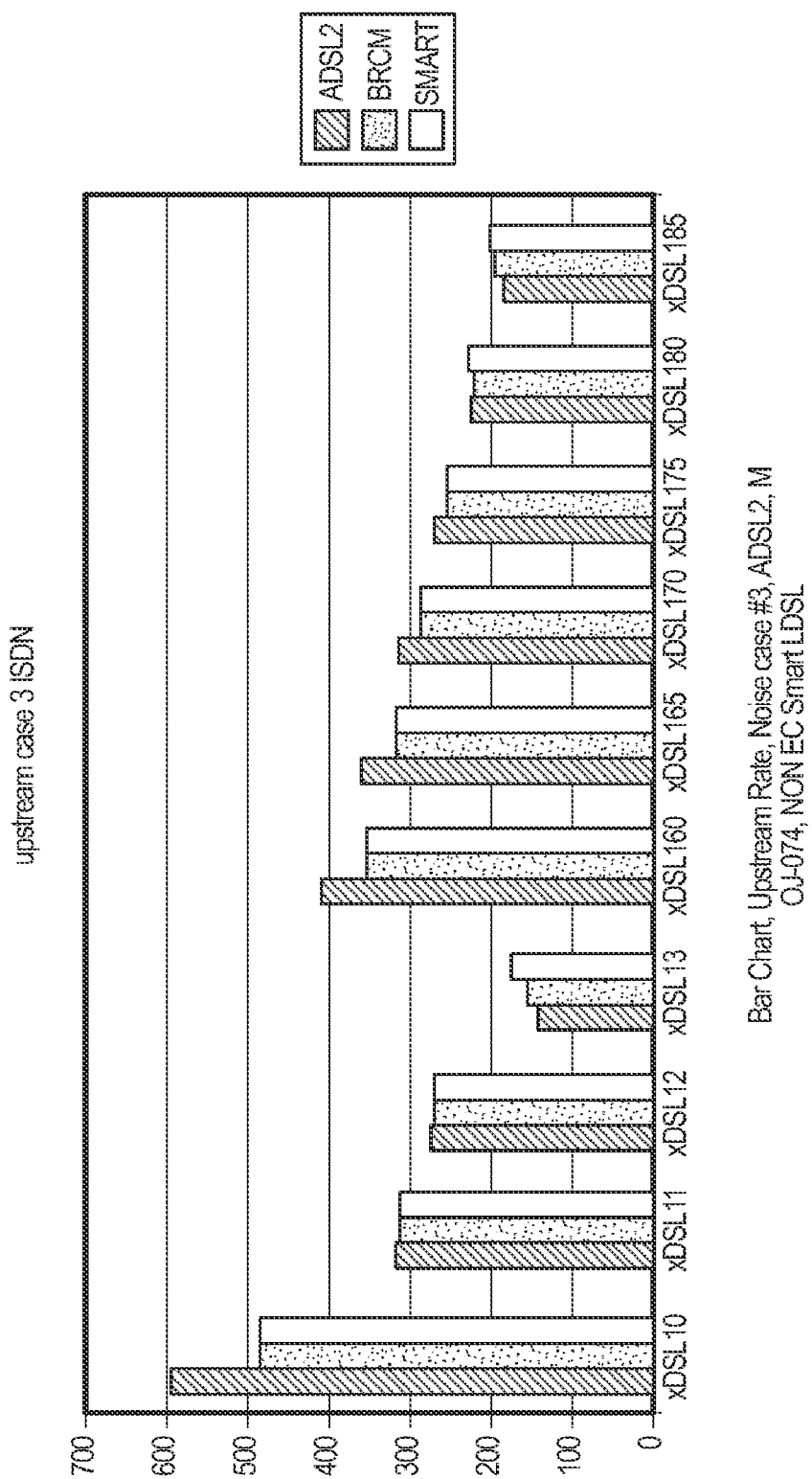
FIG. 6 is a bar chart illustrating upstream rate, noise case #3, ADSL2, M OJ-074, NON EC Smart LDSL systems in accordance with embodiments of the invention.
Figure 7:
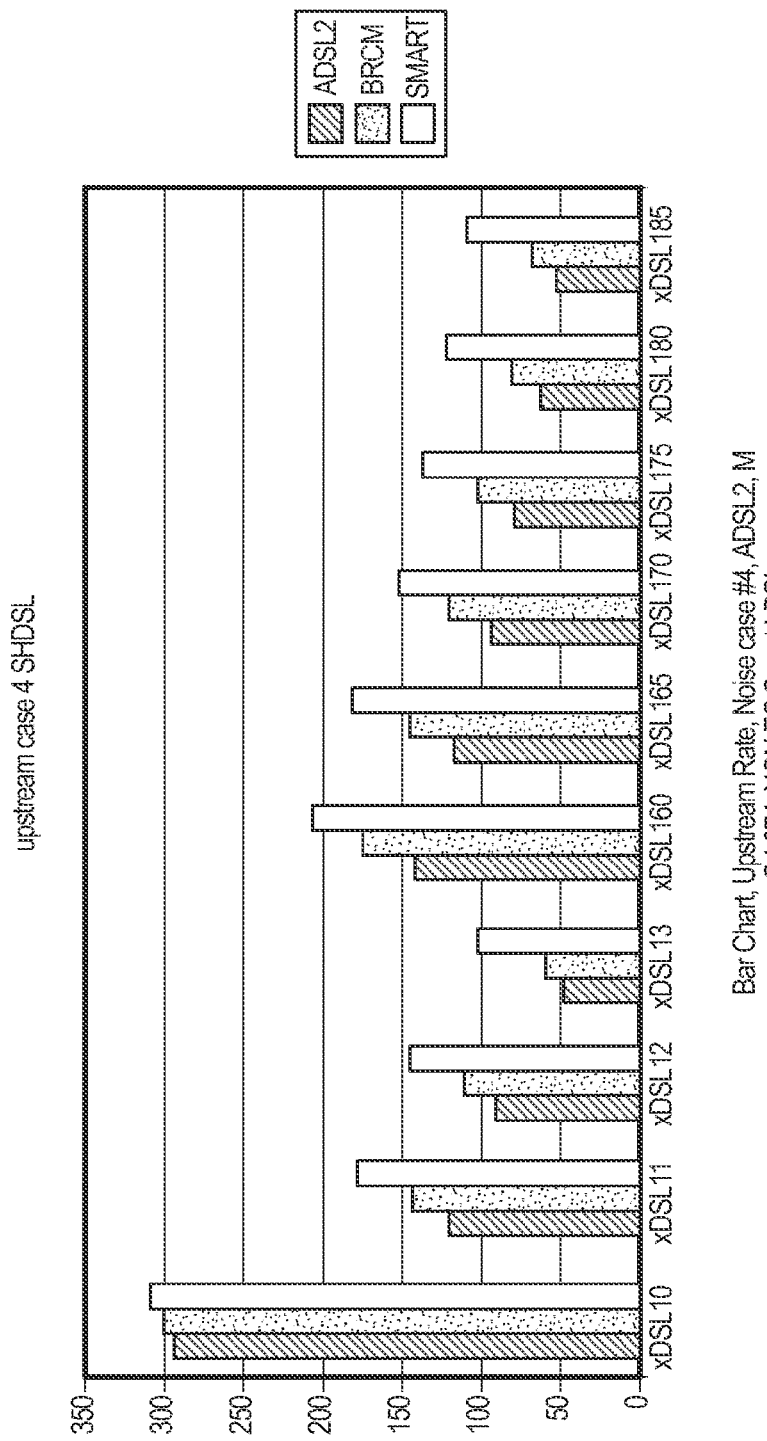
FIG. 7 is a bar chart illustrating upstream rate, noise case #4, ADSL2, M OJ-074, NON EC Smart LDSL systems in accordance with embodiments of the invention.
Figure 8:
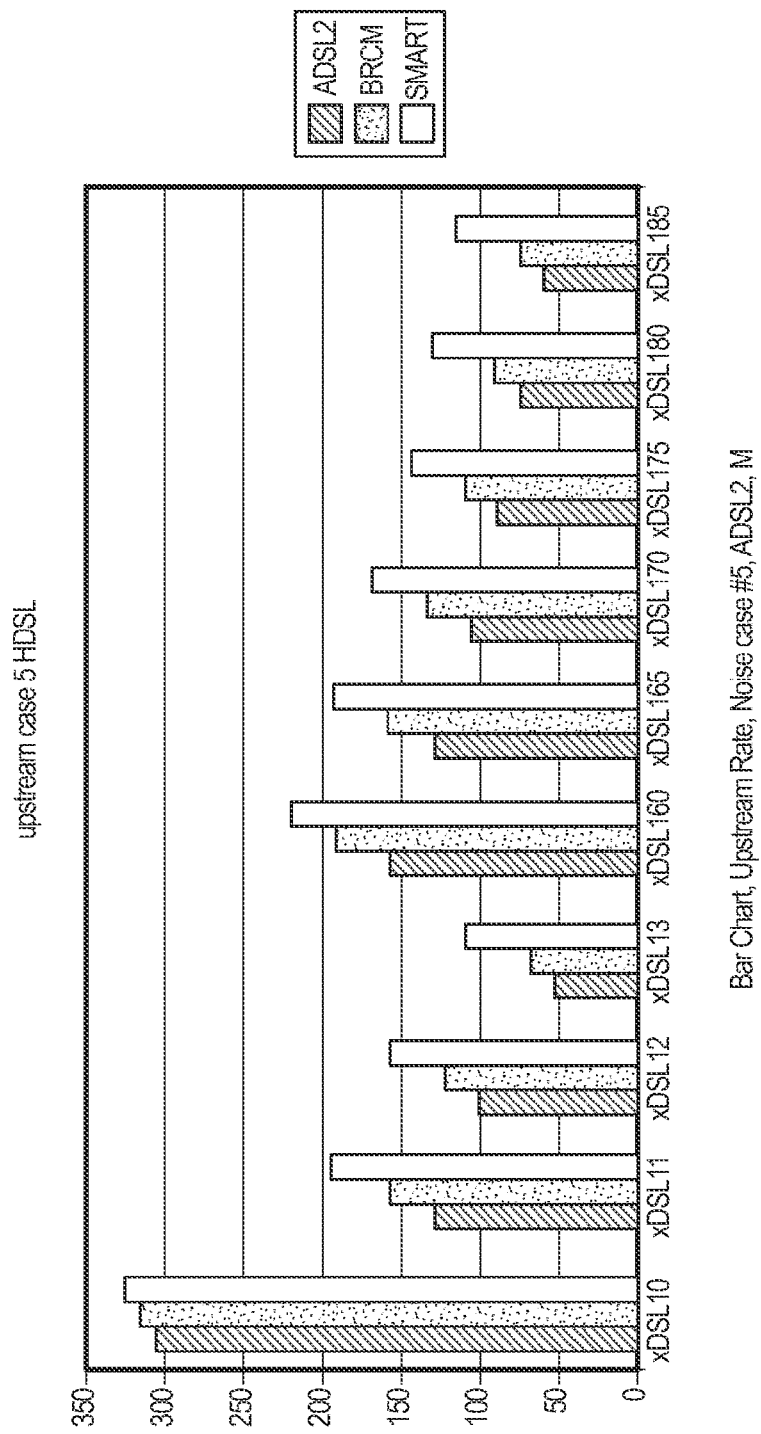
FIG. 8 is a bar chart illustrating upstream rate, noise case #5, ADSL2, M OJ-074, NON EC Smart LDSL systems in accordance with embodiments of the invention.
Figure 9:
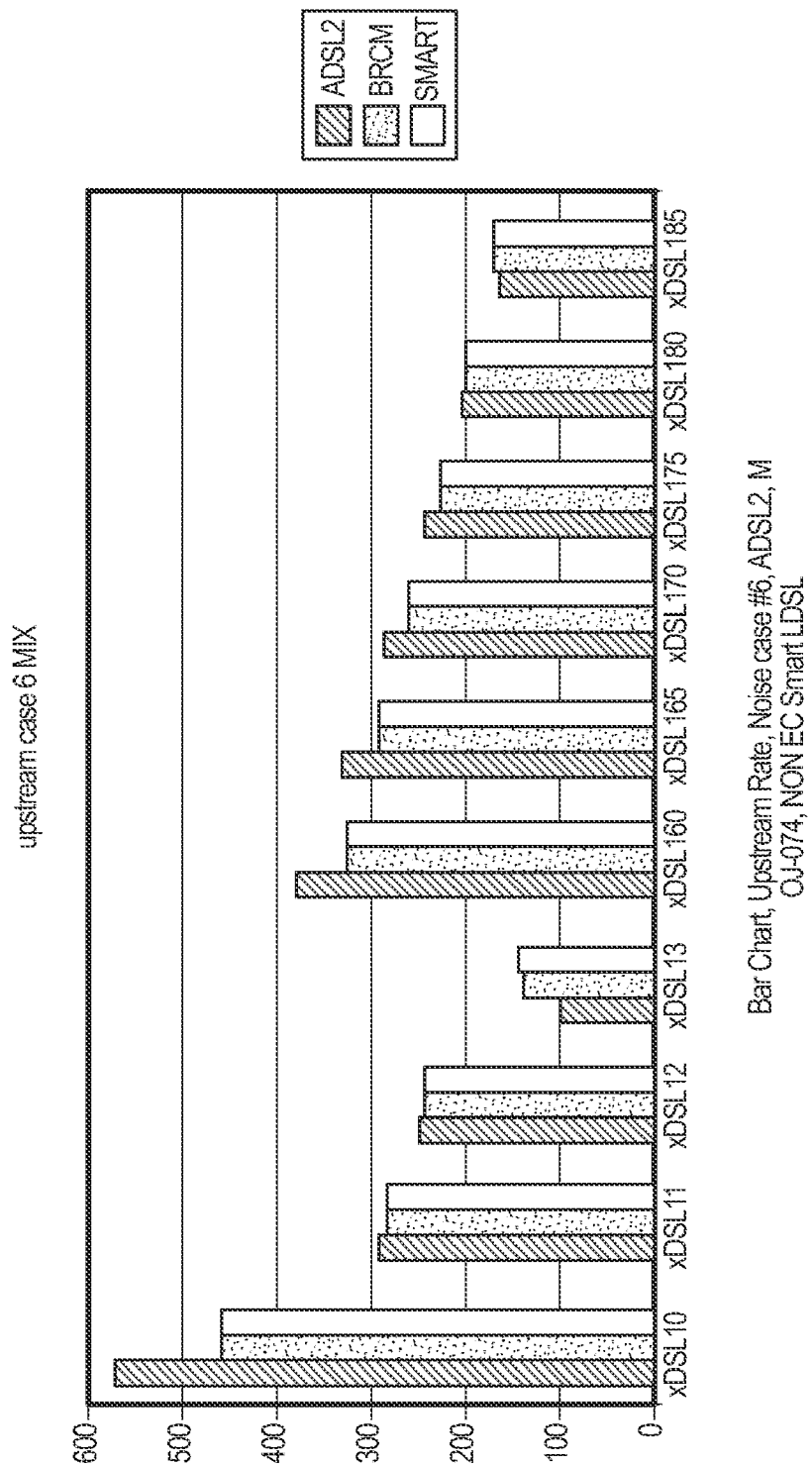
FIG. 9 is a bar chart illustrating upstream rate, noise case #6, ADSL2, M OJ-074, NON EC Smart LDSL systems in accordance with embodiments of the invention.
Figure 10:
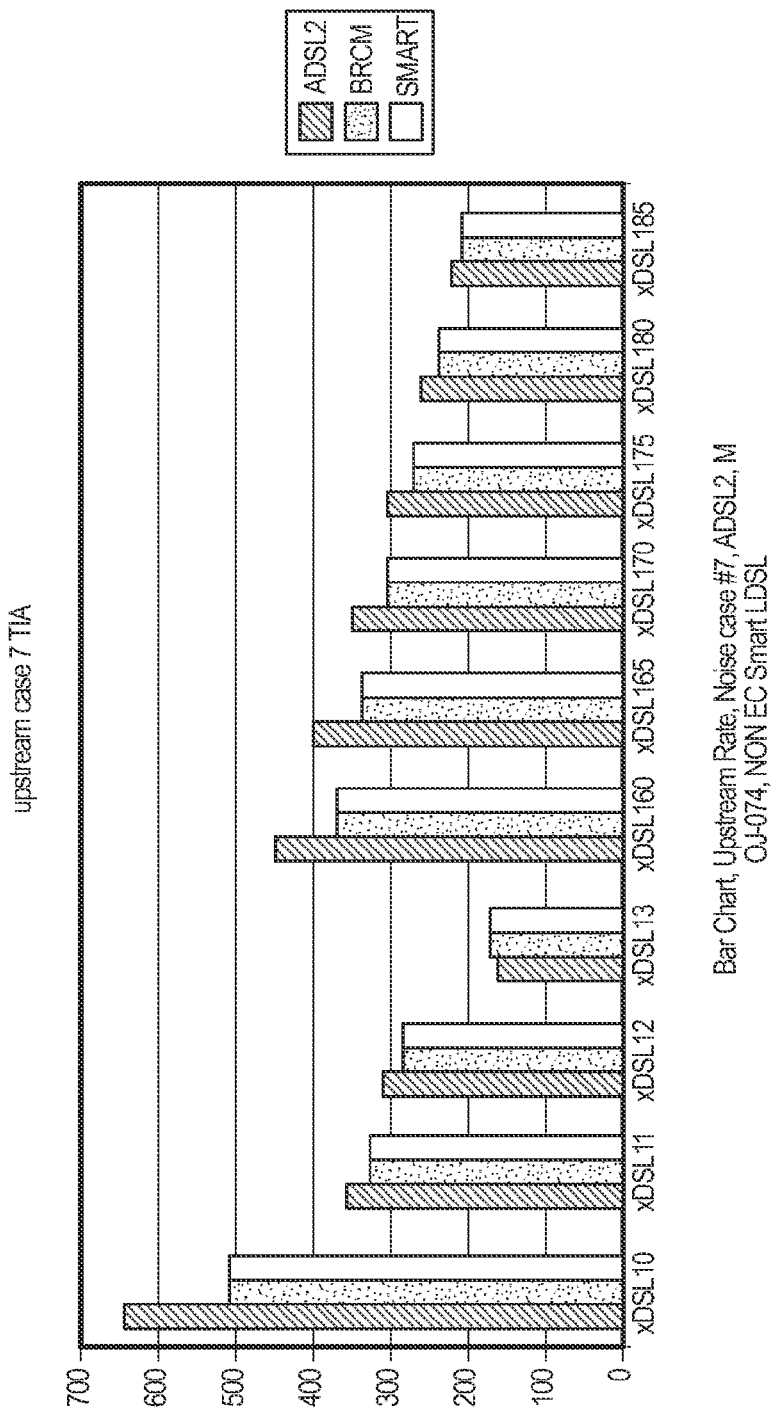
FIG. 10 is a bar chart illustrating upstream rate, noise case #7, ADSL2, M OJ-074, NON EC Smart LDSL systems in accordance with embodiments of the invention.
Figure 11:
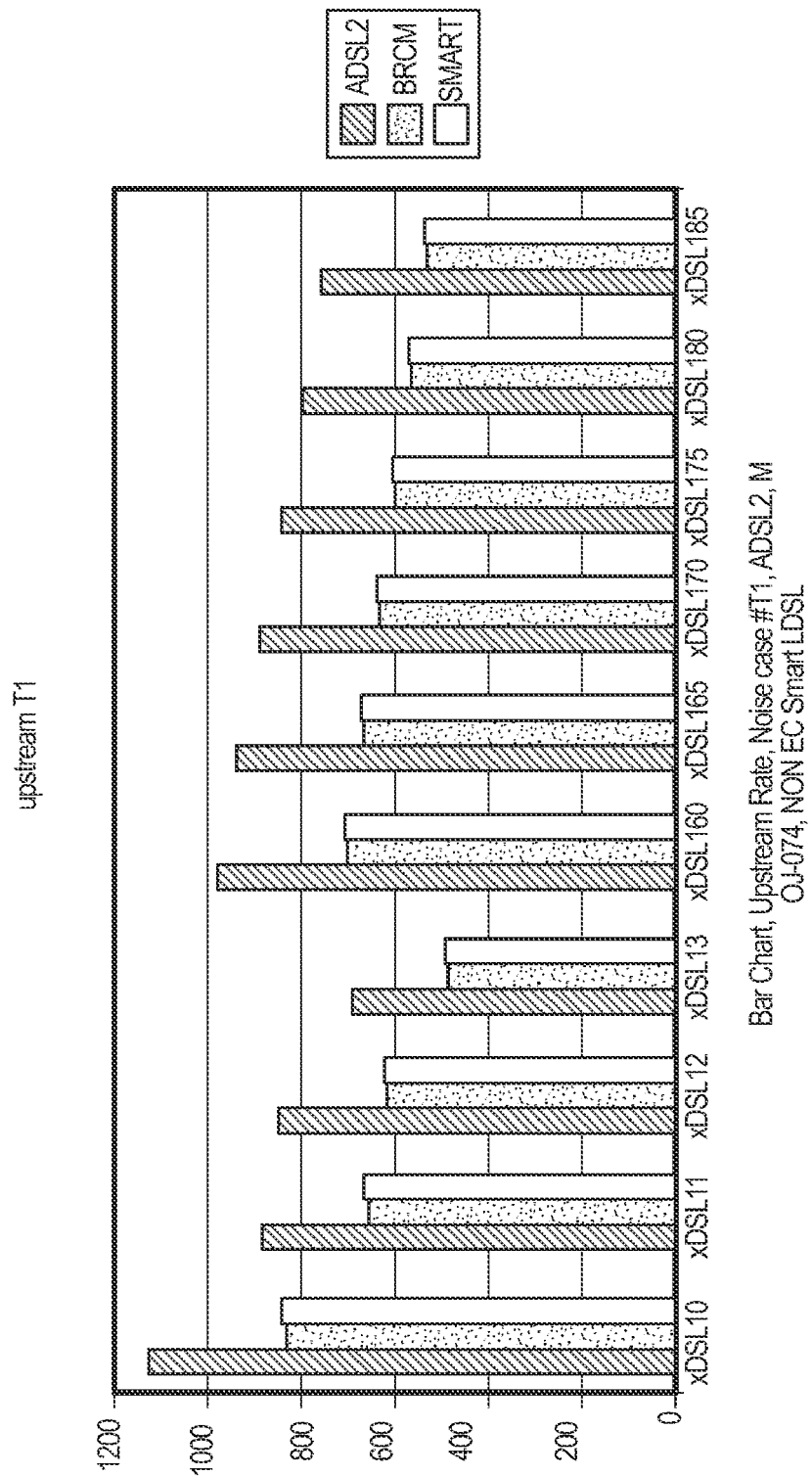
FIG. 11 is a bar chart illustrating upstream rate, noise case #T1, ADSL2, M OJ-074, NON EC Smart LDSL systems in accordance with embodiments of the invention.
Figure 12:
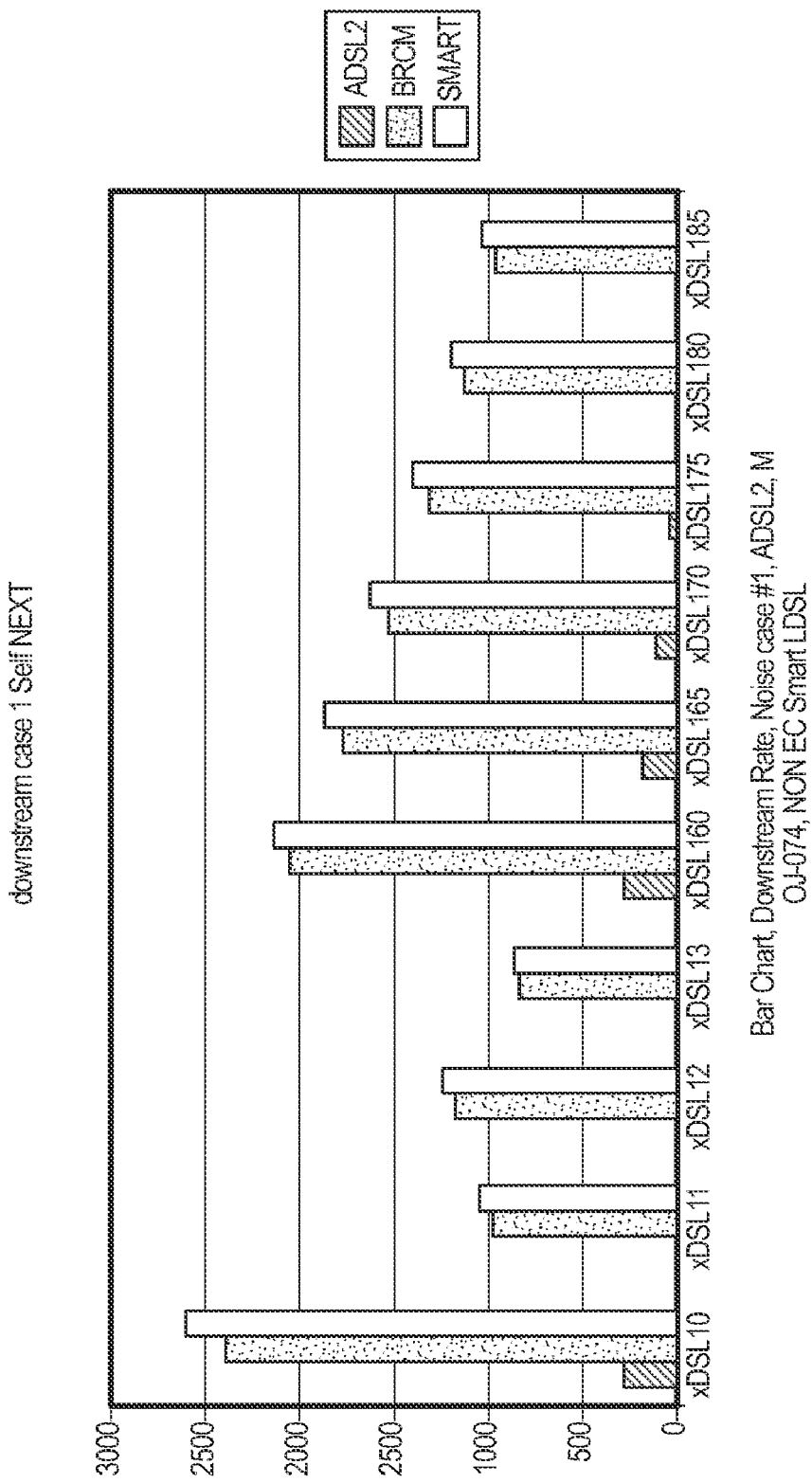
FIG. 12 is a bar chart illustrating downstream rate, noise case #1, ADSL2, M OJ-074, NON EC Smart LDSL systems in accordance with embodiments of the invention.
Figure 13:
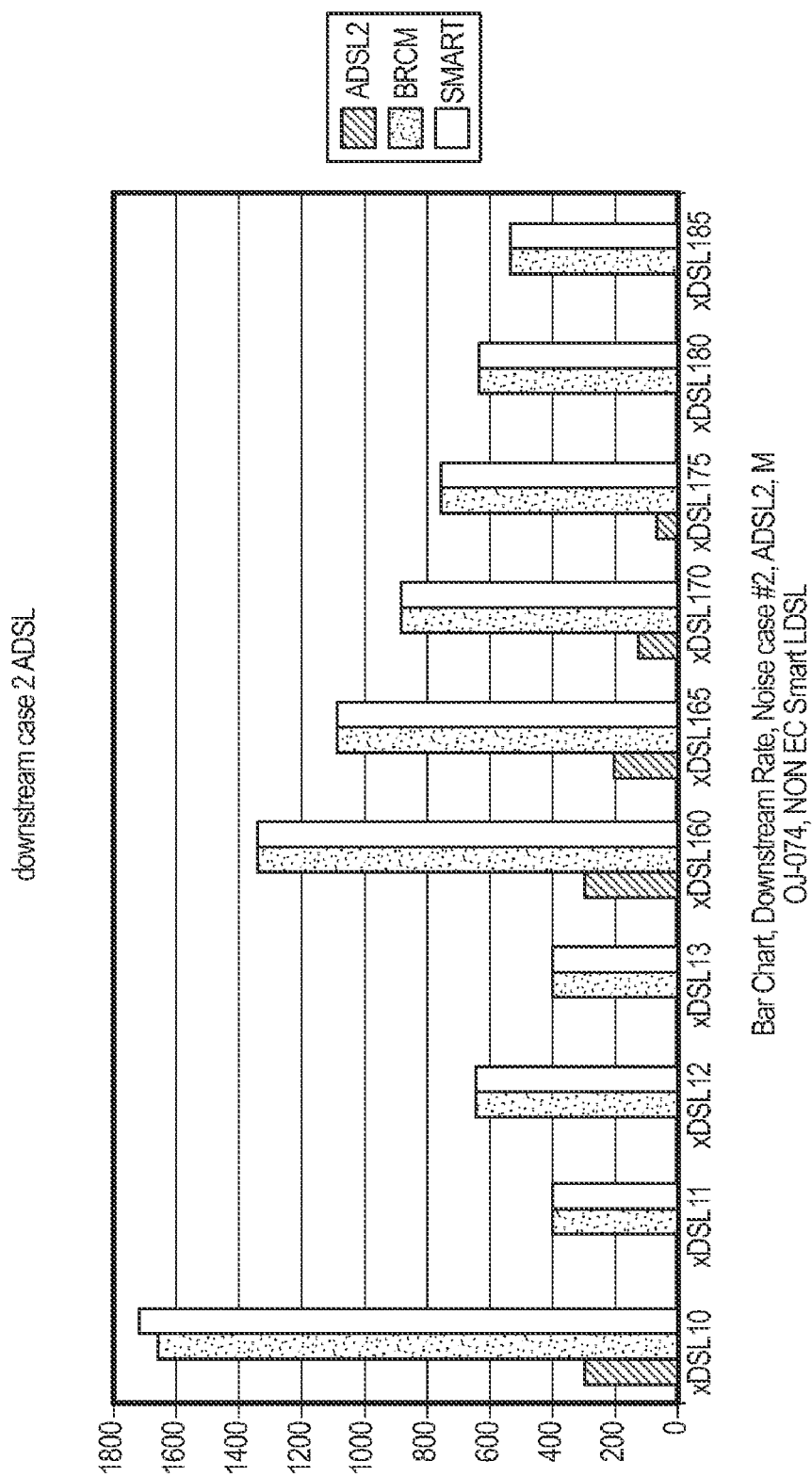
FIG. 13 is a bar chart illustrating downstream rate, noise case #2, ADSL2, M OJ-074, NON EC Smart LDSL systems in accordance with embodiments of the invention.
Figure 14:
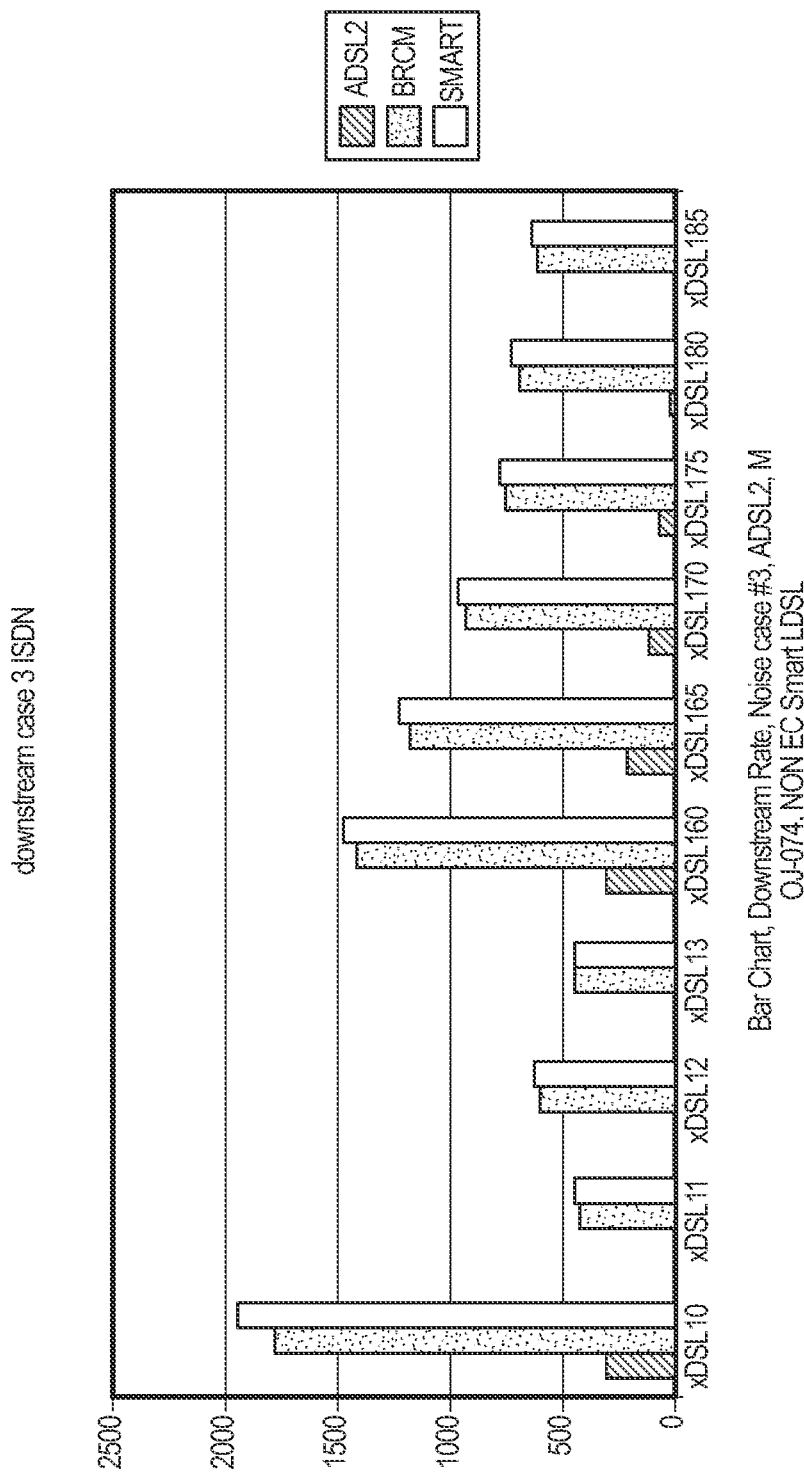
FIG. 14 is a bar chart illustrating downstream rate, noise case #3, ADSL2, M OJ-074, NON EC Smart LDSL systems in accordance with embodiments of the invention.
Figure 15:
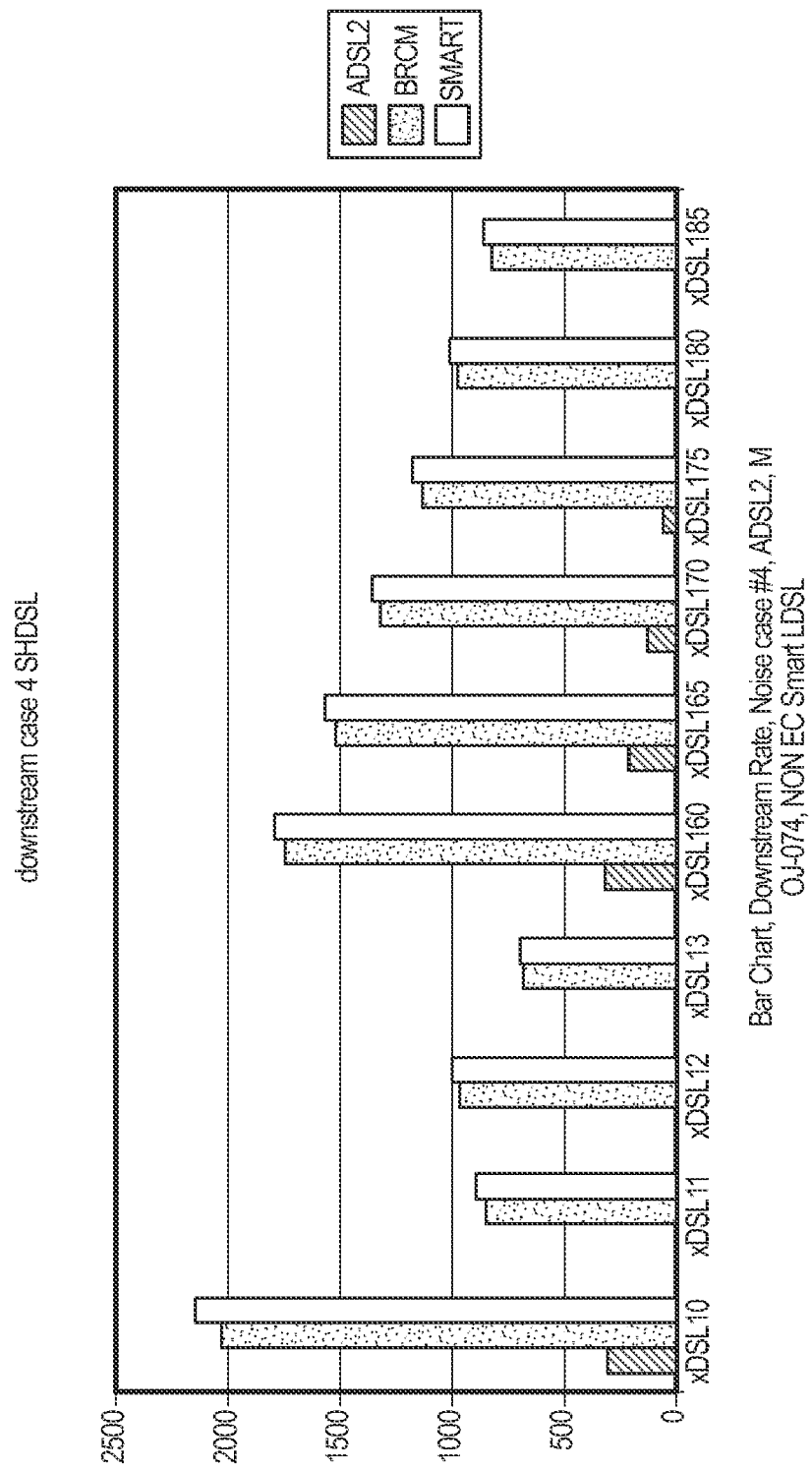
FIG. 15 is a bar chart illustrating downstream rate, noise case #4, ADSL2, M OJ-074, NON EC Smart LDSL systems in accordance with embodiments of the invention.
Figure 16:
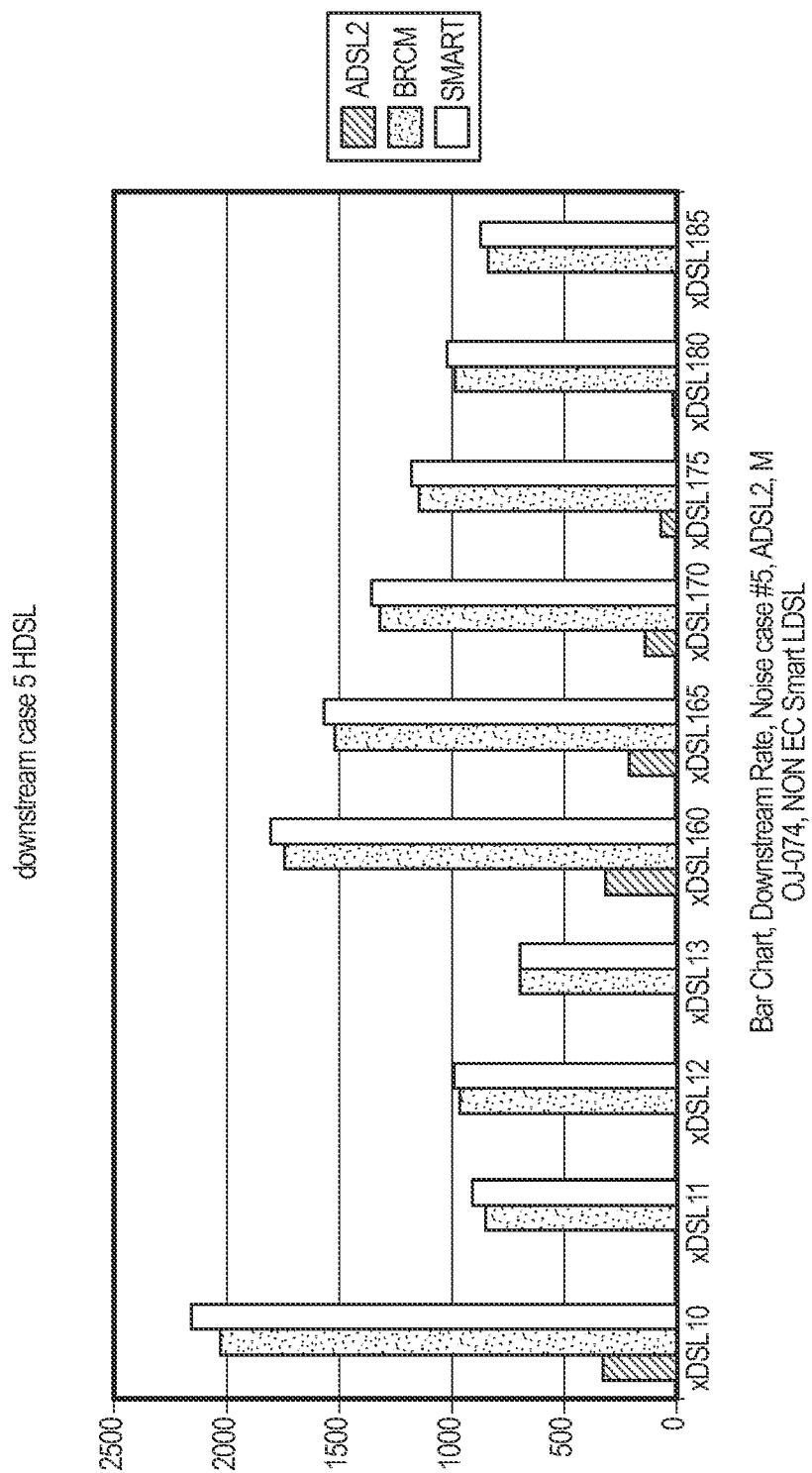
FIG. 16 is a bar chart illustrating downstream rate, noise case #5, ADSL2, M OJ-074, NON EC Smart LDSL systems in accordance with embodiments of the invention.
Figure 17:
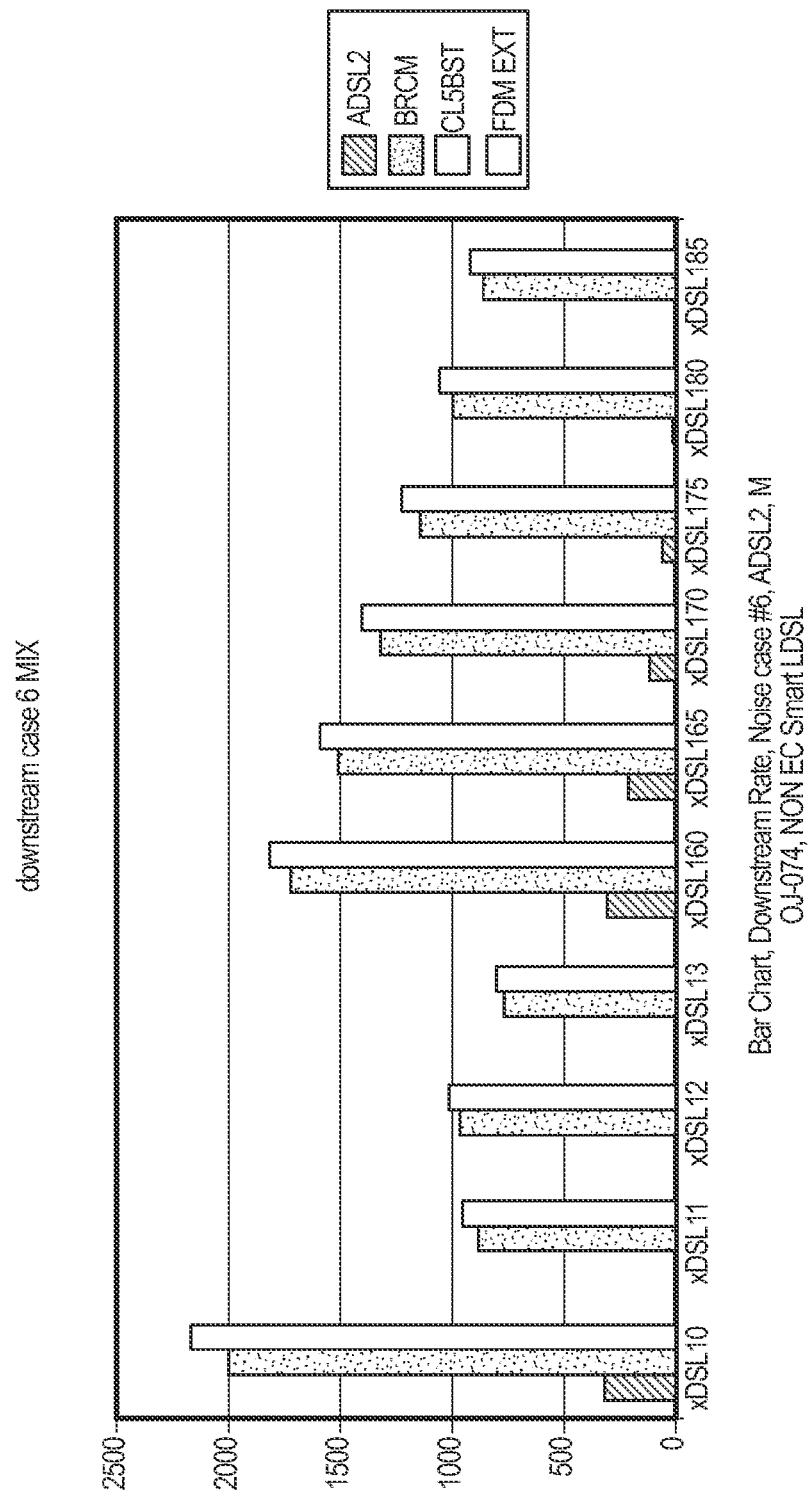
FIG. 17 is a bar chart illustrating downstream rate, noise case #6, ADSL2, M OJ-074, NON EC Smart LDSL systems in accordance with embodiments of the invention.
Figure 18:
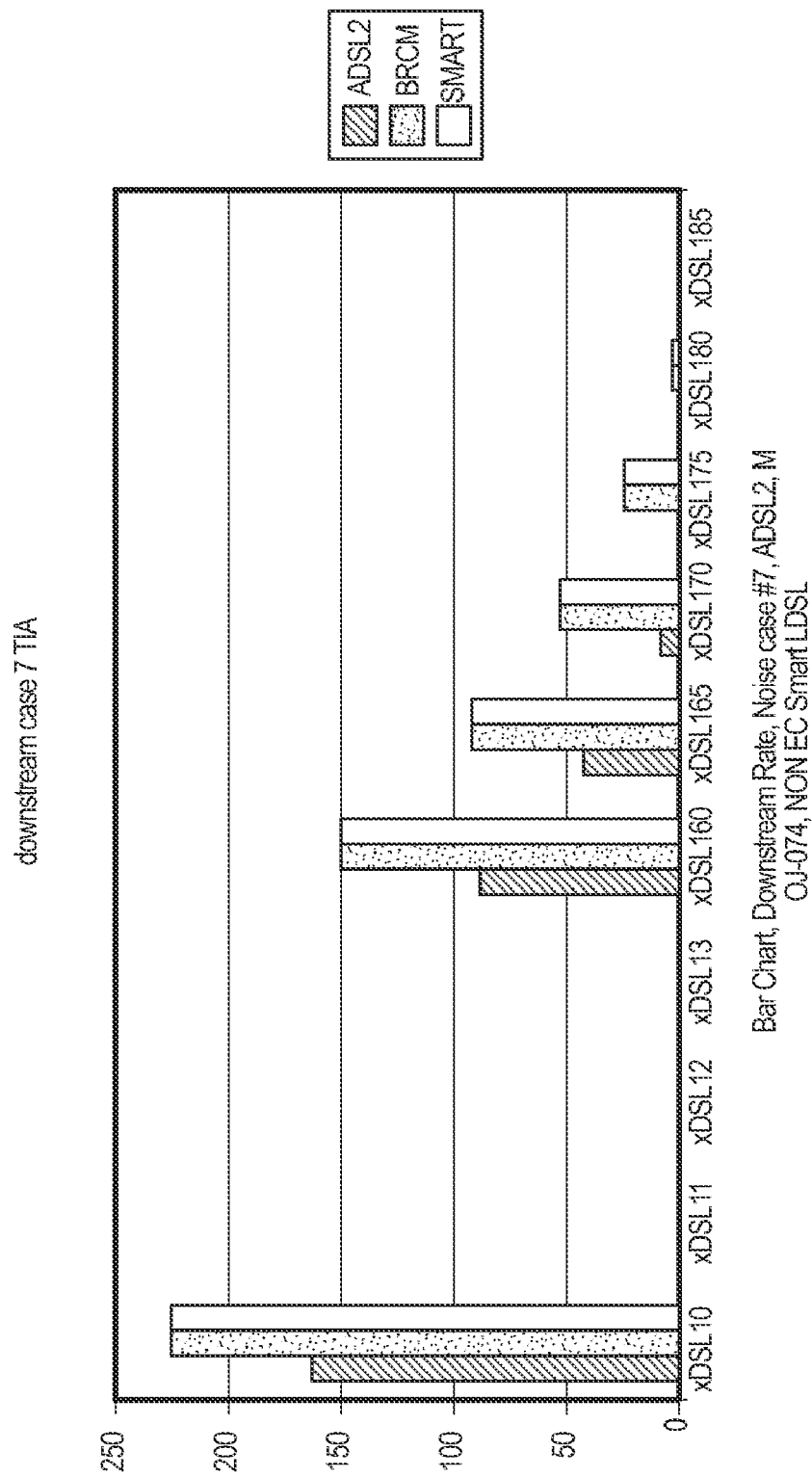
FIG. 18 is a bar chart illustrating downstream rate, noise case #7, ADSL2, M OJ-074, NON EC Smart LDSL systems in accordance with embodiments of the invention.
Figure 19:
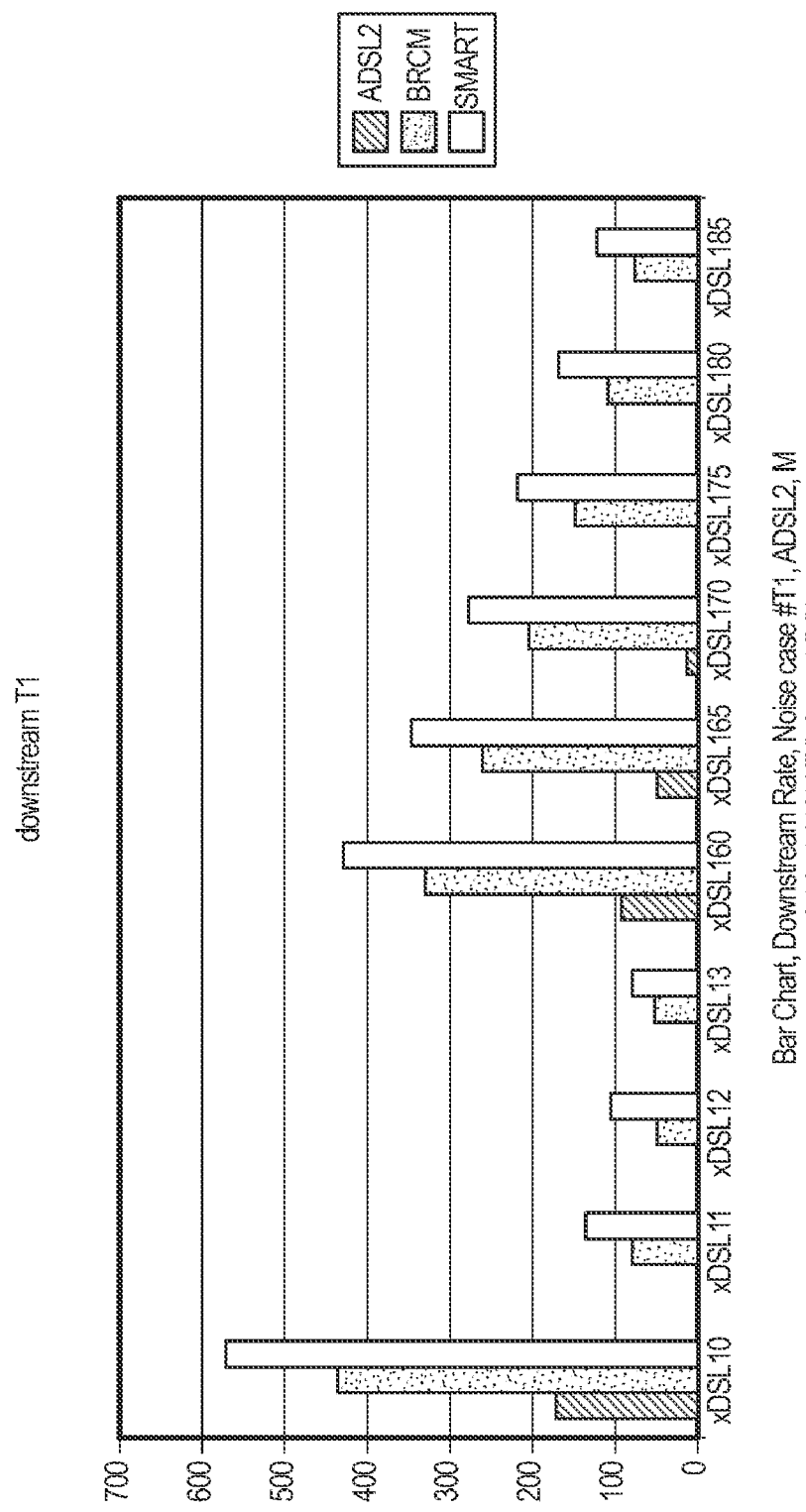
FIG. 19 is a bar chart illustrating downstream rate, noise case #T1, ADSL2, M OJ-074, NON EC Smart LDSL systems in accordance with embodiments of the invention.
Figure 20:
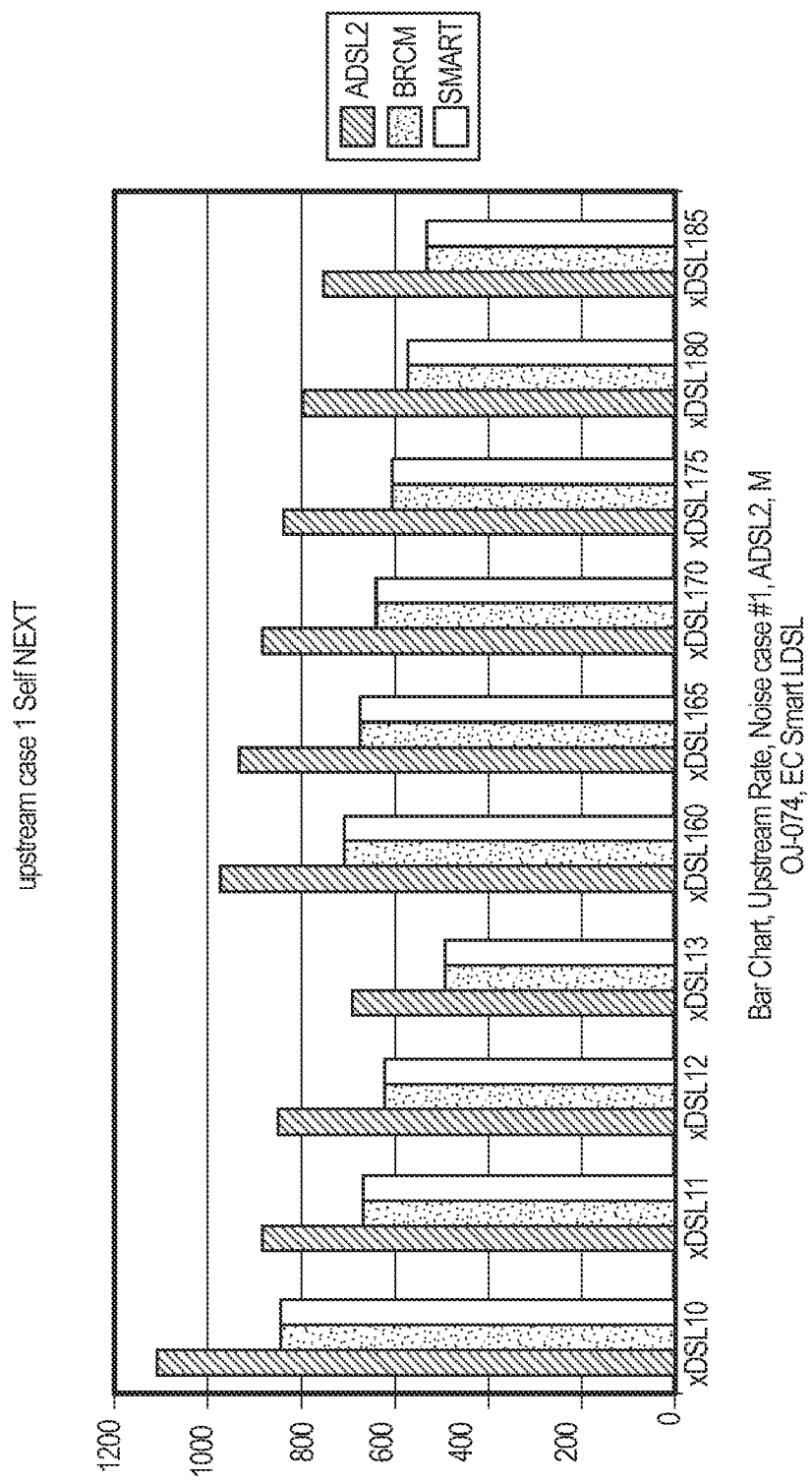
FIG. 20 is a bar chart illustrating upstream rate, noise case #1, ADSL2, M OJ-074, EC Smart LDSL systems in accordance with embodiments of the invention.
Figure 21:
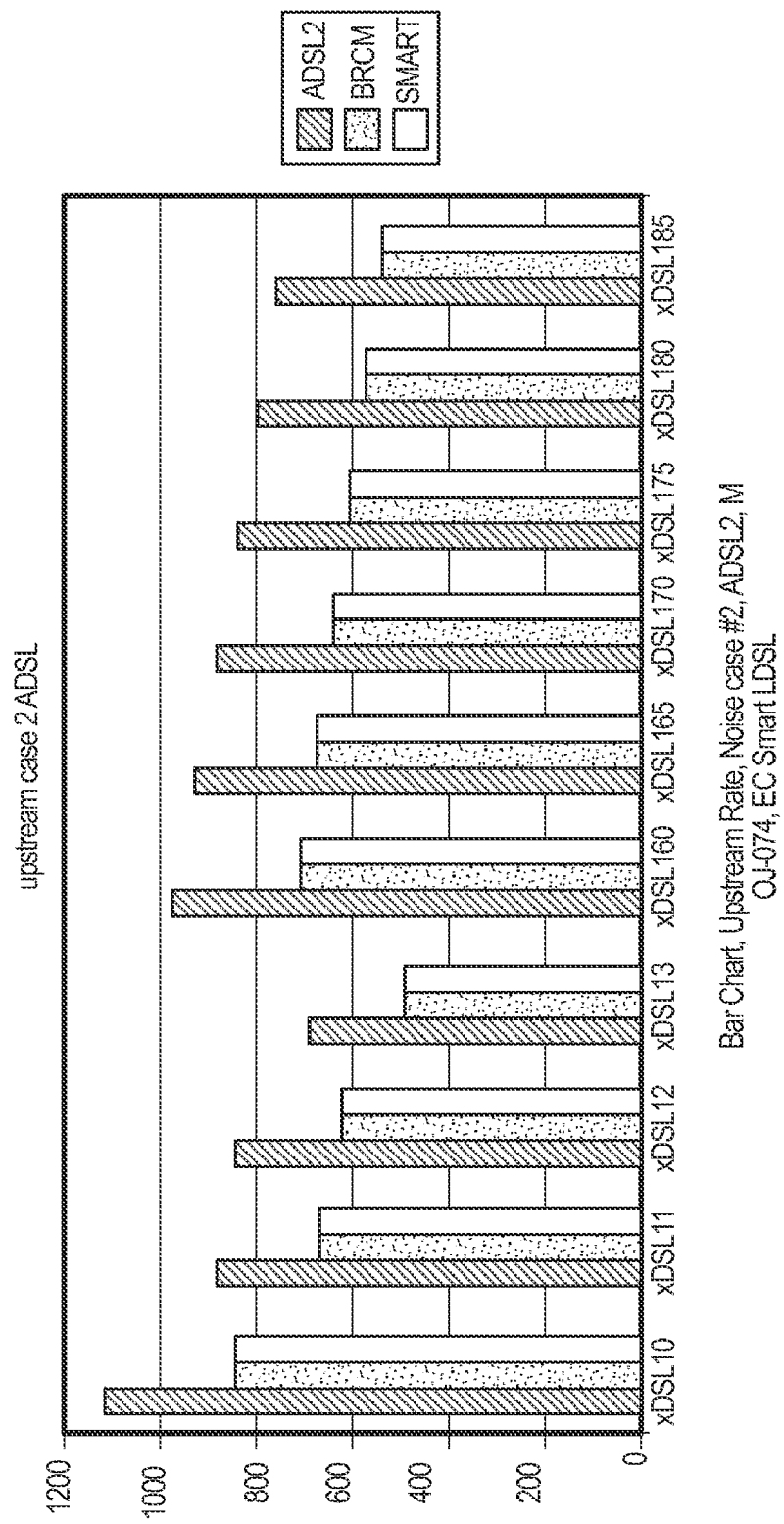
FIG. 21 is a bar chart illustrating upstream rate, noise case #2, ADSL2, M OJ-074, EC Smart LDSL systems in accordance with embodiments of the invention.
Figure 22:
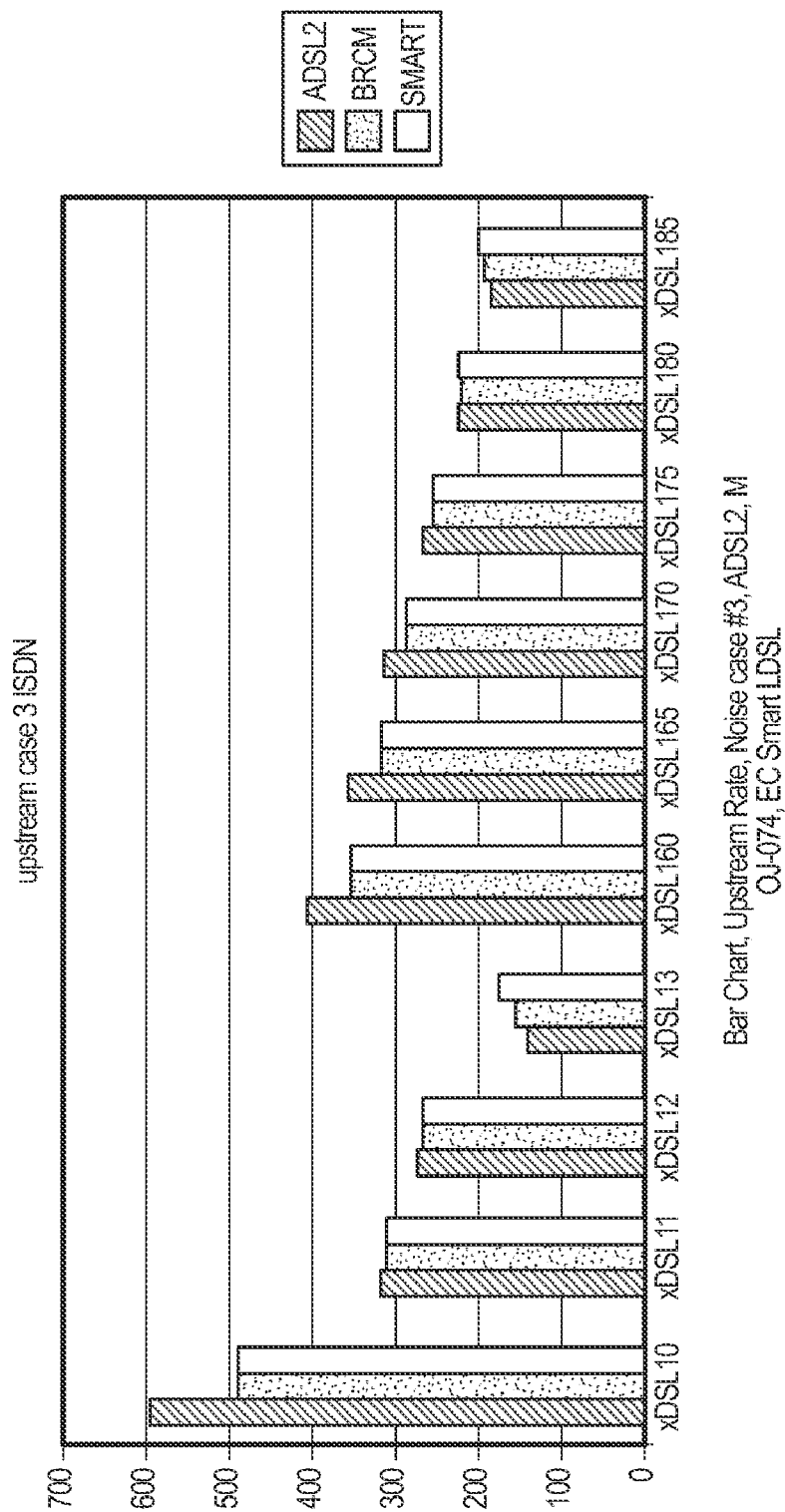
FIG. 22 is a bar chart illustrating upstream rate, noise case #3, ADSL2, M OJ-074, EC Smart LDSL systems in accordance with embodiments of the invention.
Figure 23:
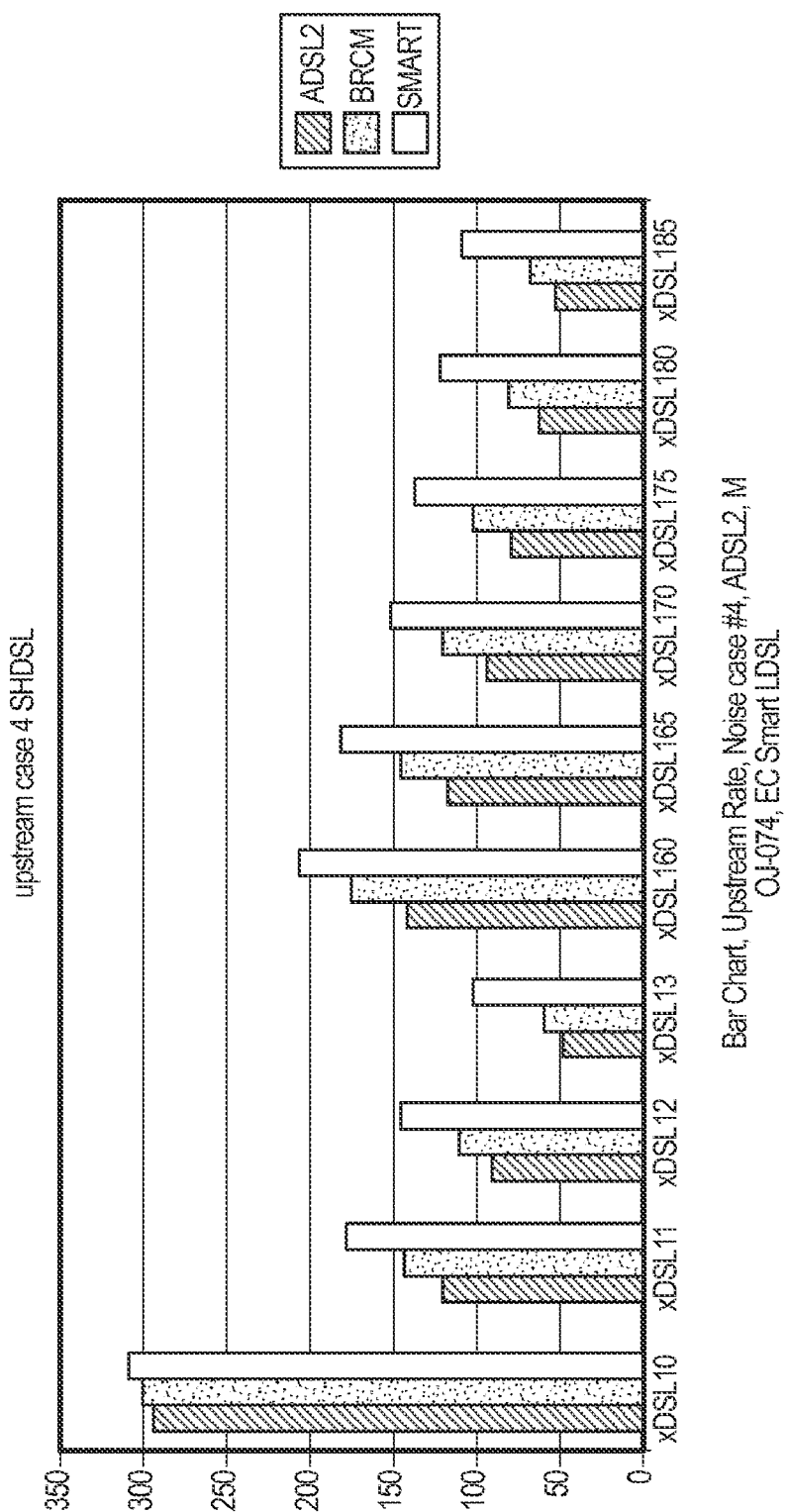
FIG. 23 is a bar chart illustrating upstream rate, noise case #4, ADSL2, M OJ-074, EC Smart LDSL systems in accordance with embodiments of the invention.
Figure 24:
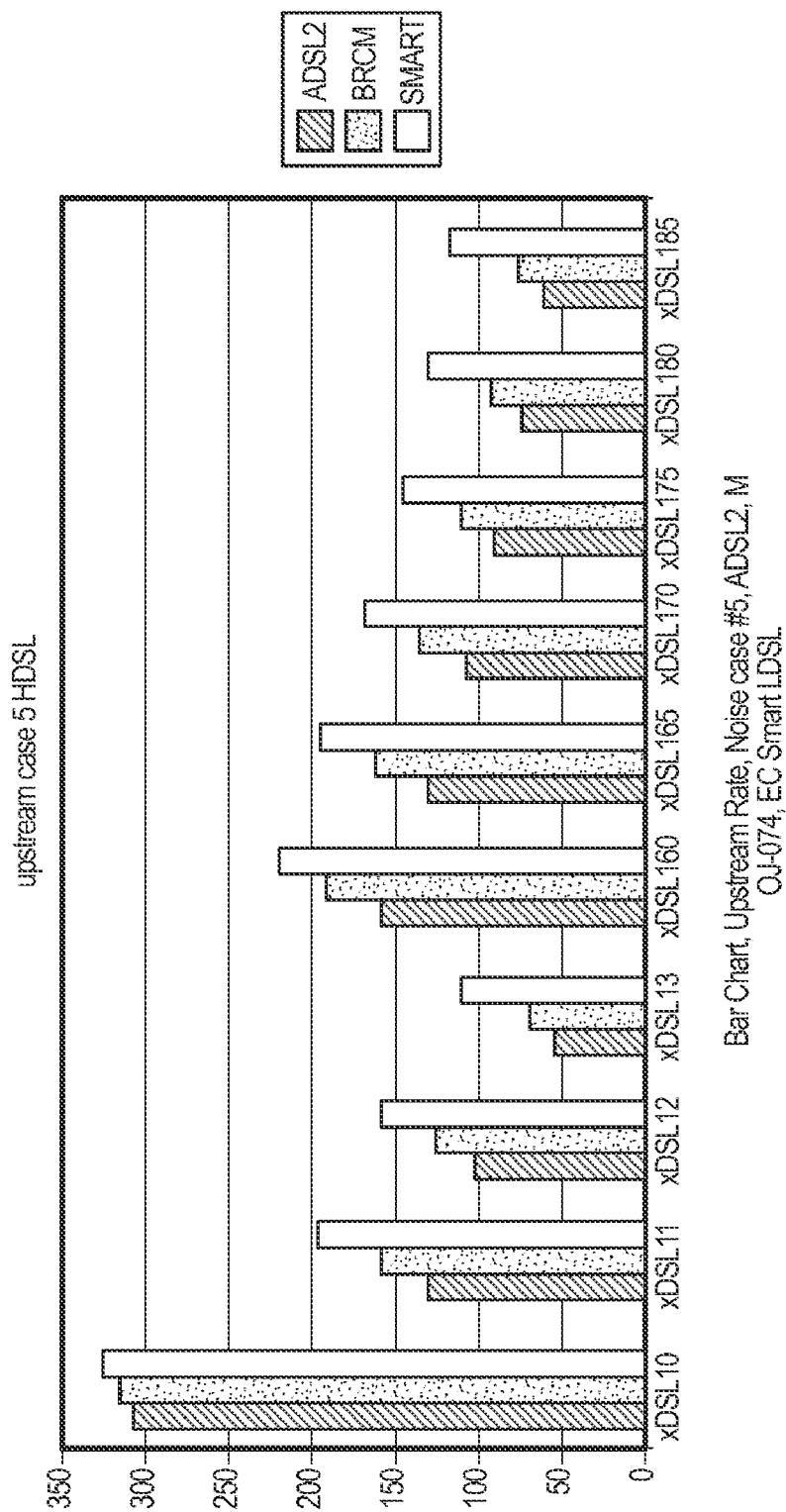
FIG. 24 is a bar chart illustrating upstream rate, noise case #5, ADSL2, M OJ-074, EC Smart LDSL systems in accordance with embodiments of the invention.
Figure 25:
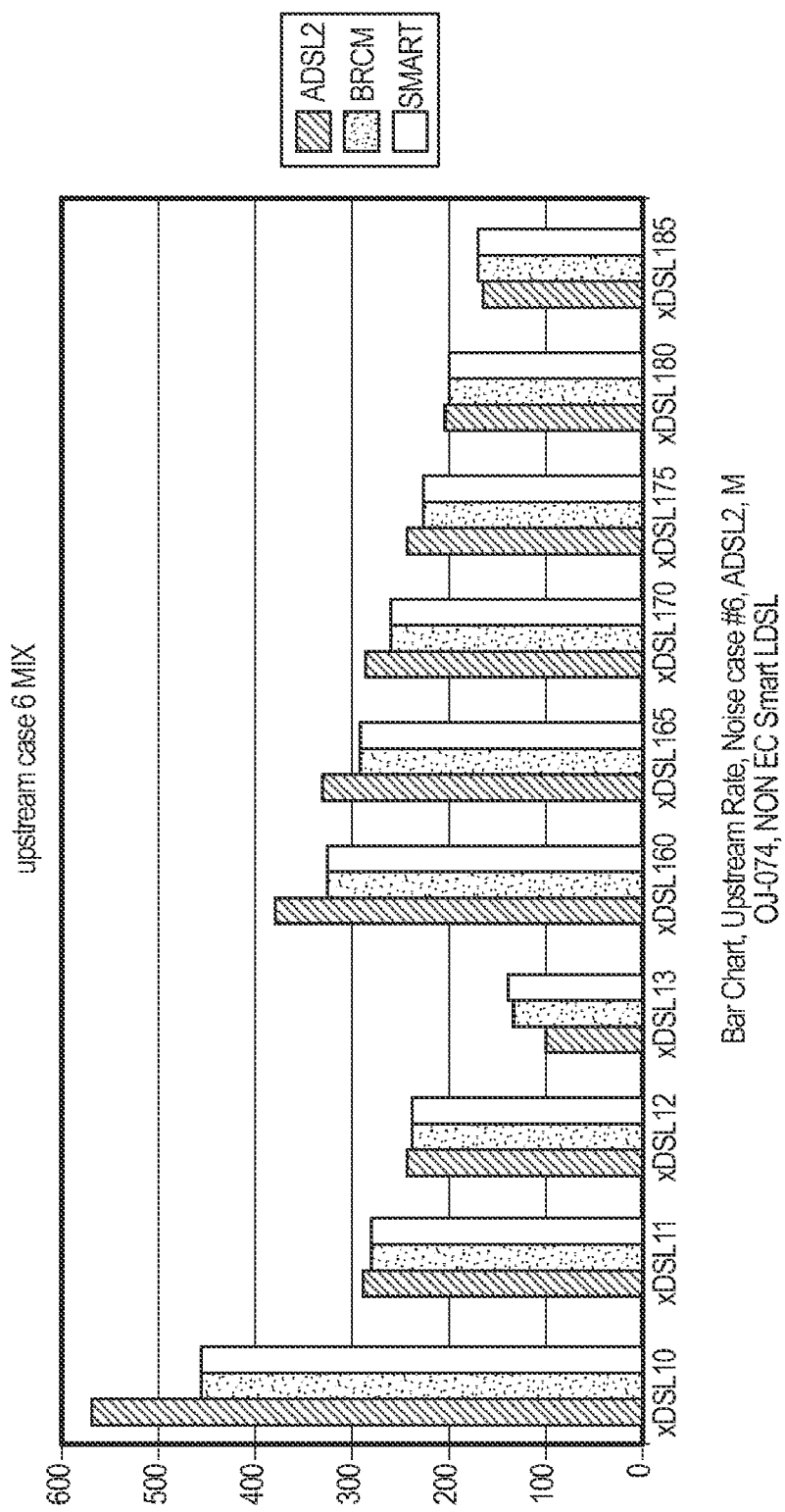
FIG. 25 is a bar chart illustrating upstream rate, noise case #6, ADSL2, M OJ-074, EC Smart LDSL systems in accordance with embodiments of the invention.
Figure 26:
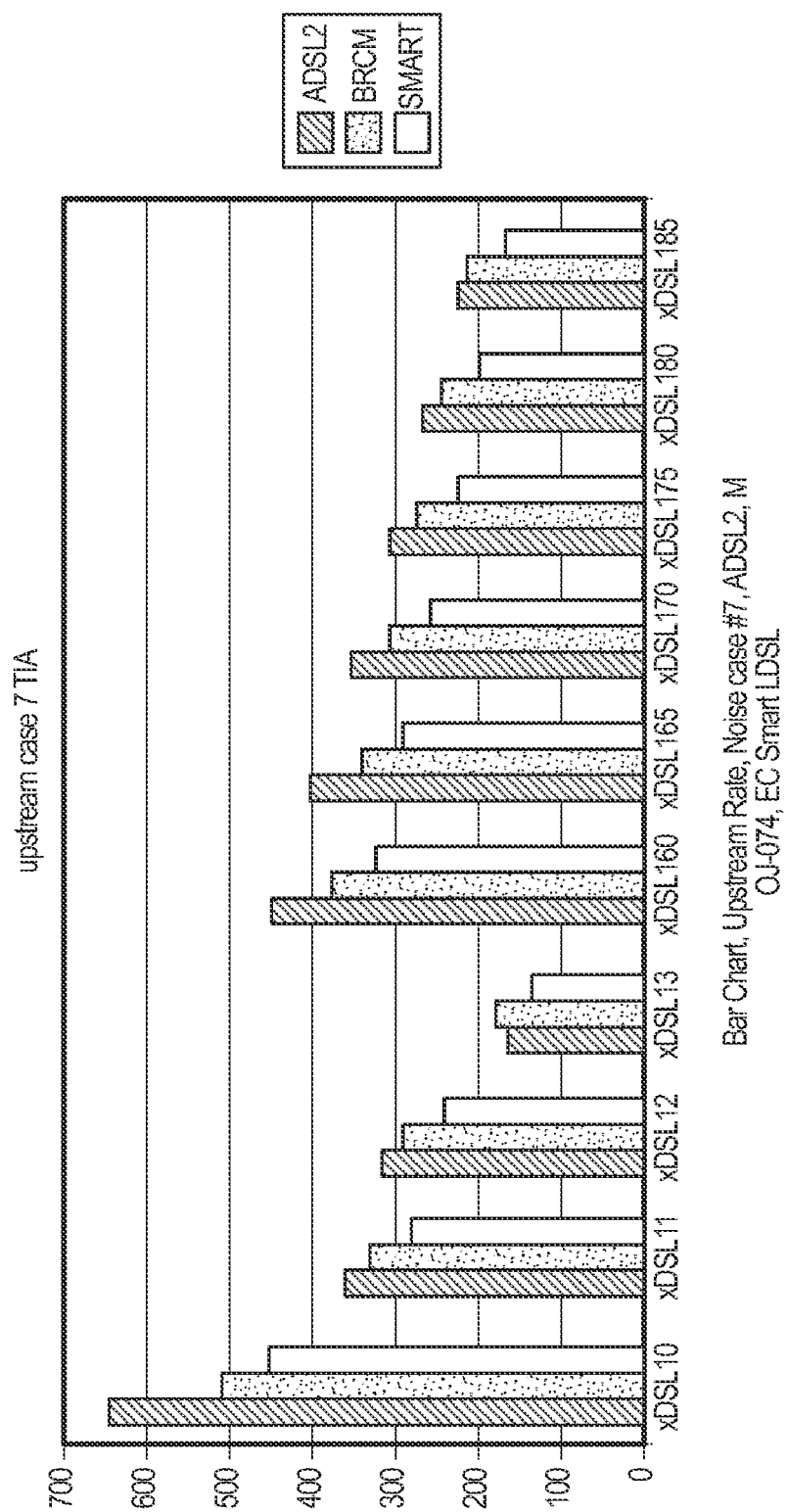
FIG. 26 is a bar chart illustrating upstream rate, noise case #7, ADSL2, M OJ-074, EC Smart LDSL systems in accordance with embodiments of the invention.
Figure 27:
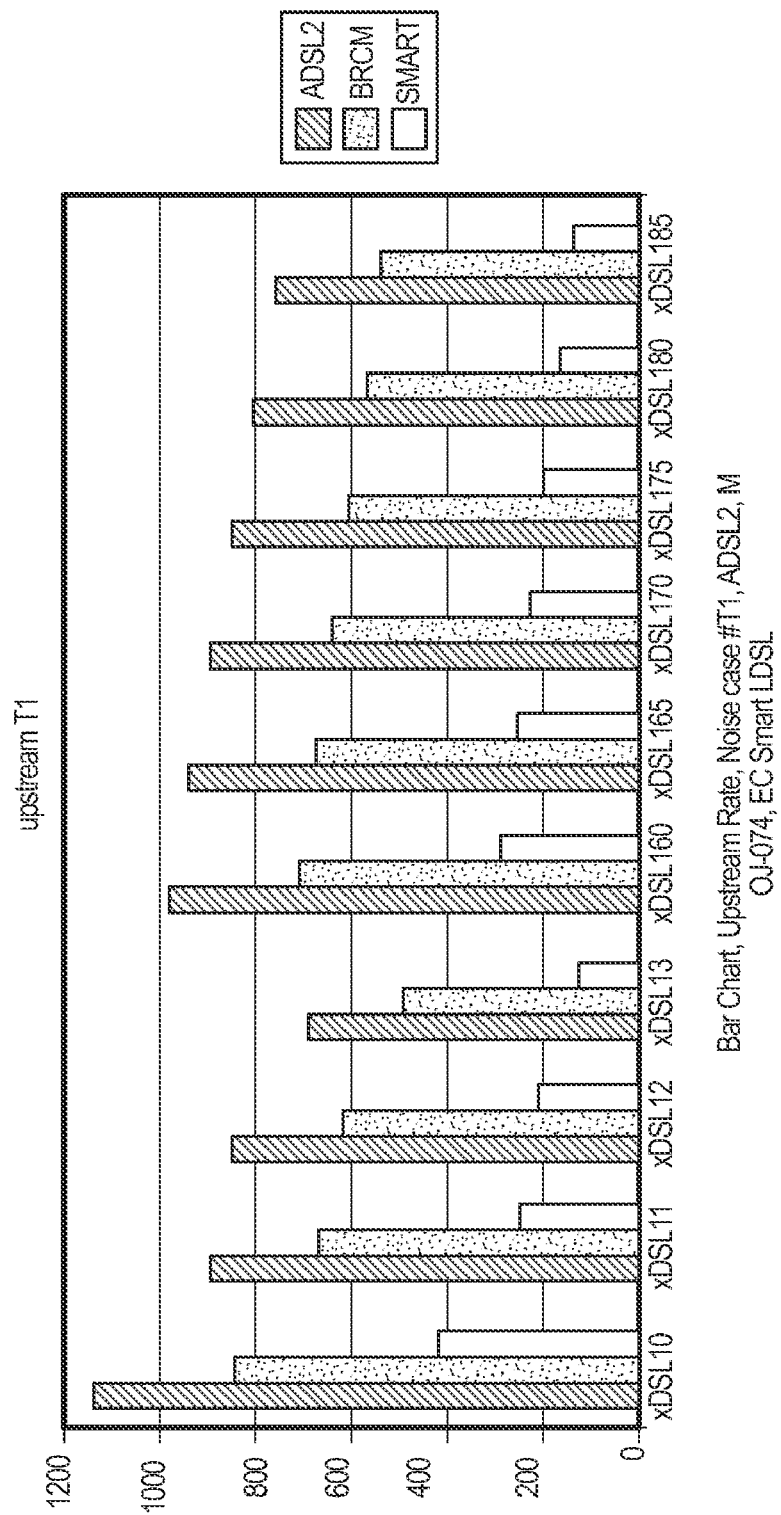
FIG. 27 is a bar chart illustrating upstream rate, noise case #T1, ADSL2, M OJ-074, EC Smart LDSL systems in accordance with embodiments of the invention.
Figure 28:
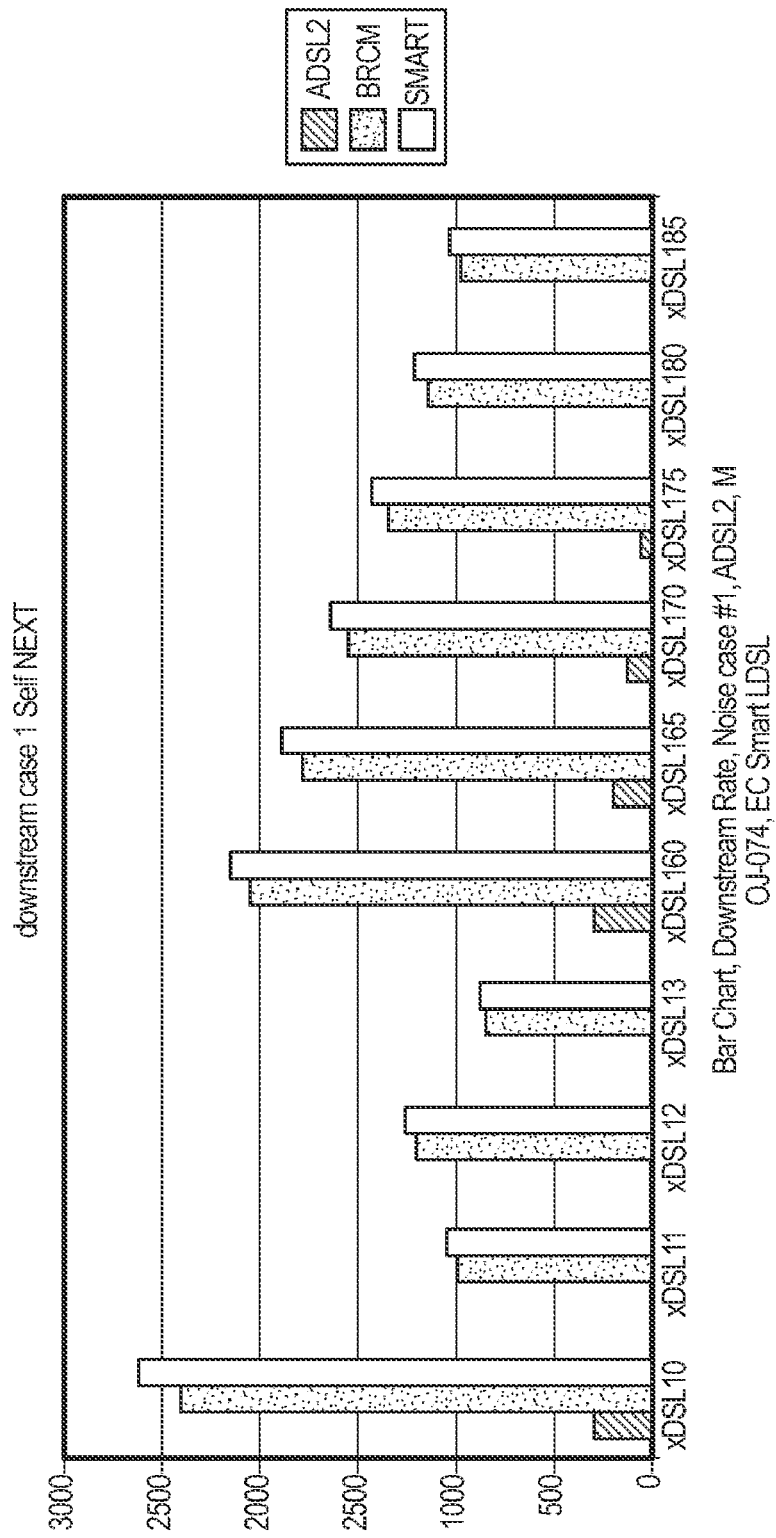
FIG. 28 is a bar chart illustrating downstream rate, noise case #1, ADSL2, M OJ-074, EC Smart LDSL systems in accordance with embodiments of the invention.
Figure 29:
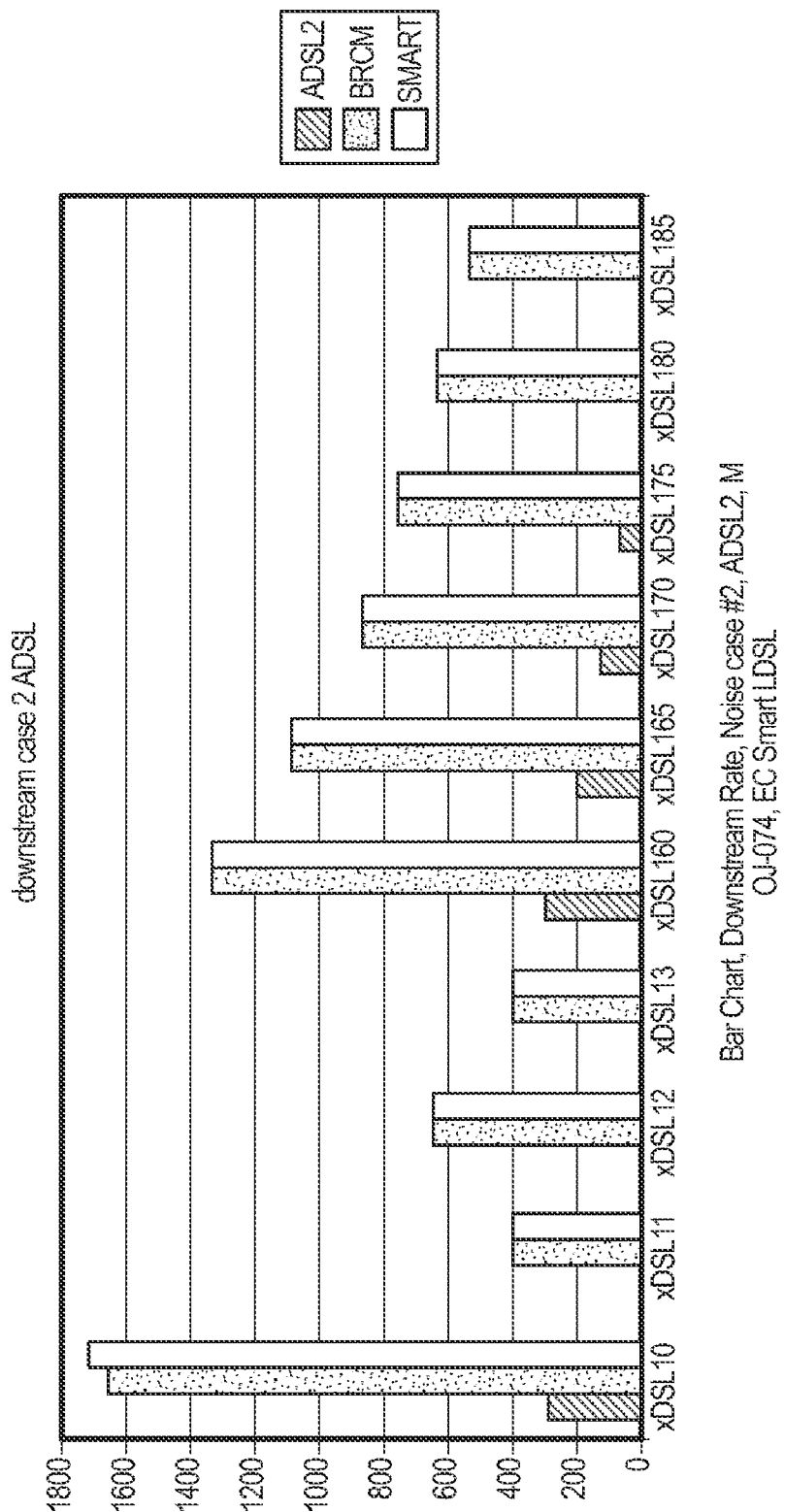
FIG. 29 is a bar chart illustrating downstream rate, noise case #2, ADSL2, M OJ-074, EC Smart LDSL systems in accordance with embodiments of the invention.
Figure 30:
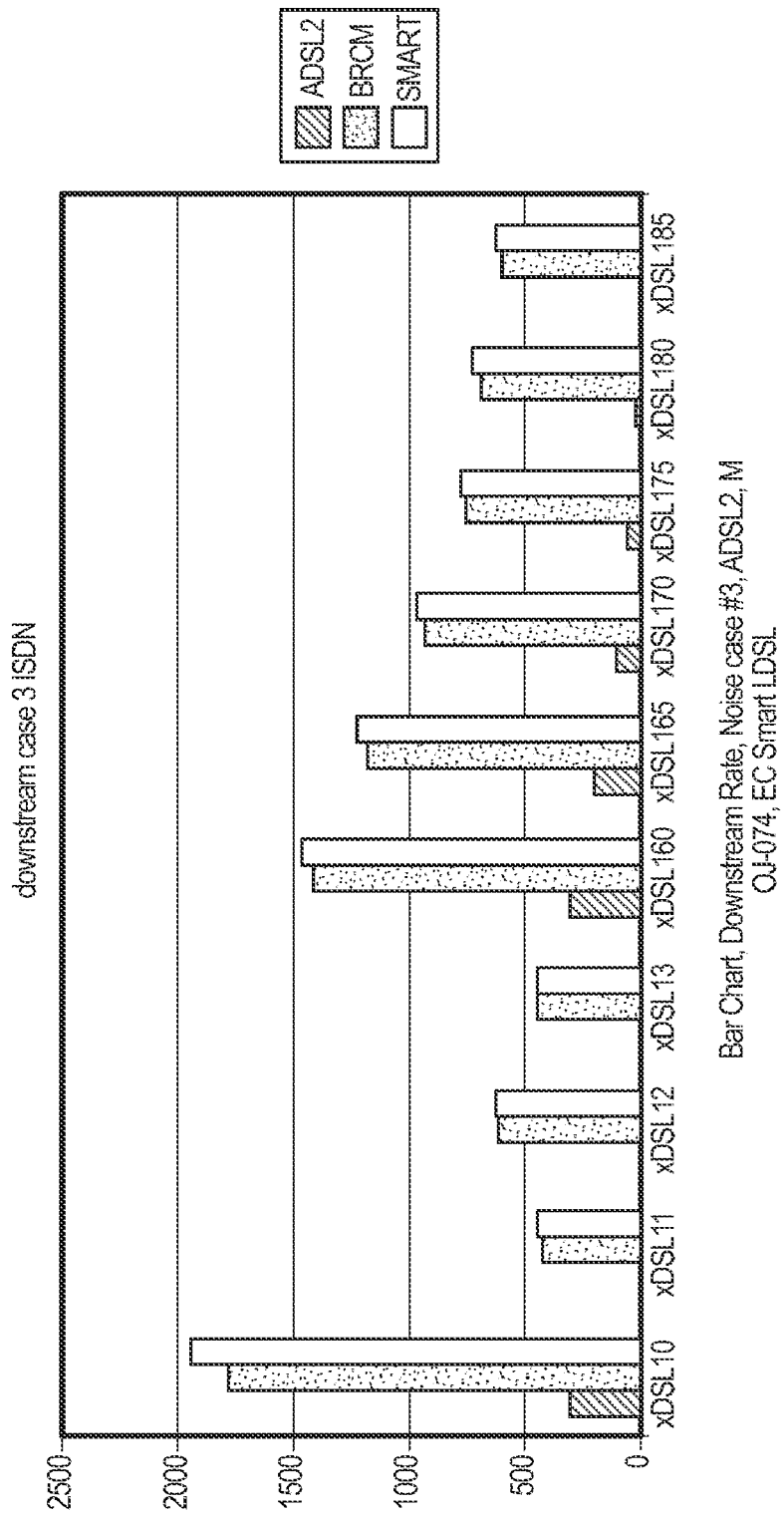
FIG. 30 is a bar chart illustrating downstream rate, noise case #3, ADSL2, M OJ-074, EC Smart LDSL systems in accordance with embodiments of the invention.
Figure 31:
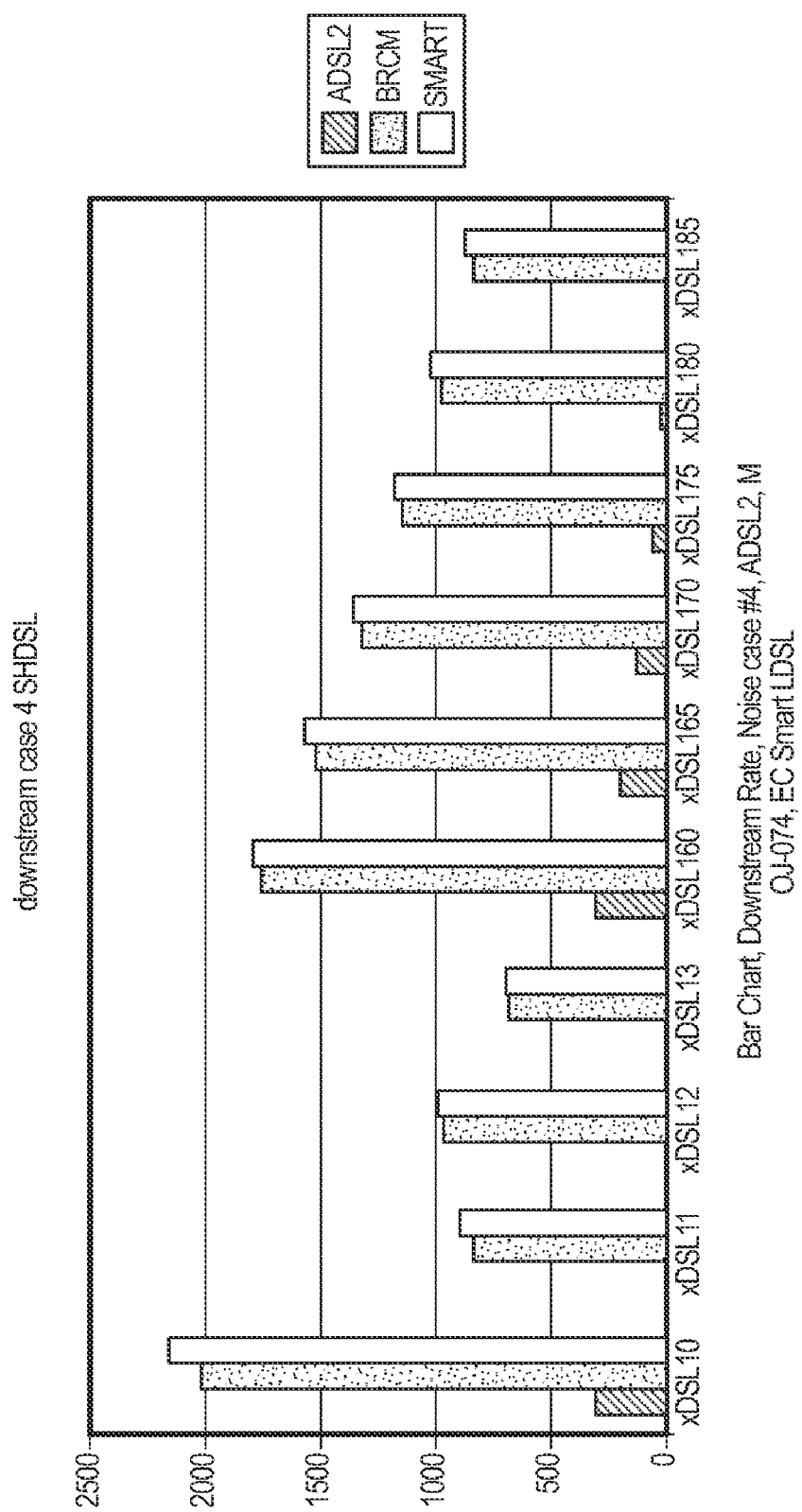
FIG. 31 is a bar chart illustrating downstream rate, noise case #4, ADSL2, M OJ-074, EC Smart LDSL systems in accordance with embodiments of the invention.
Figure 32:
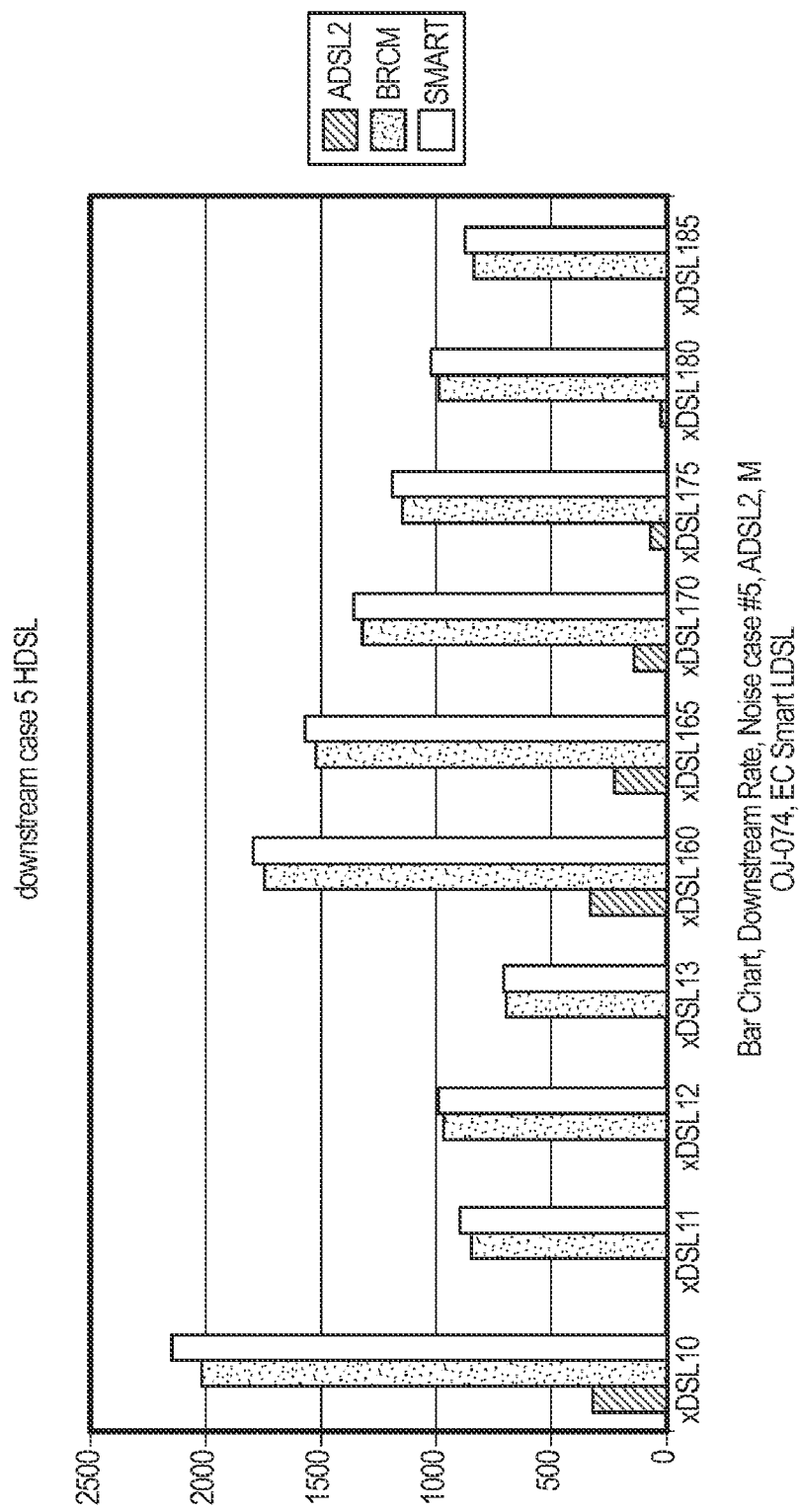
FIG. 32 is a bar chart illustrating downstream rate, noise case #5, ADSL2, M OJ-074, EC Smart LDSL systems in accordance with embodiments of the invention.
Figure 33:
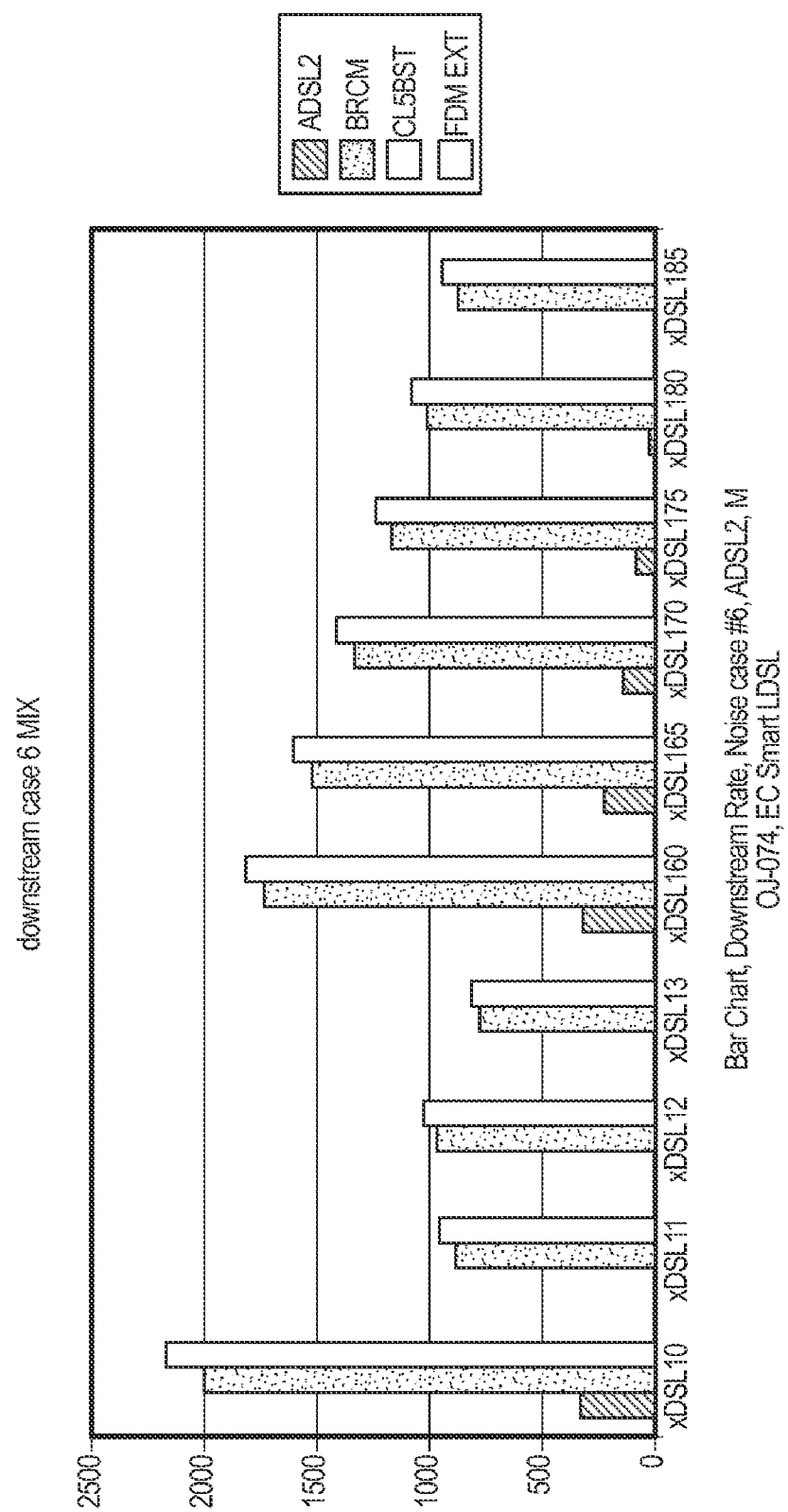
FIG. 33 is a bar chart illustrating downstream rate, noise case #6, ADSL2, M OJ-074, EC Smart LDSL systems in accordance with embodiments of the invention.
Figure 34:
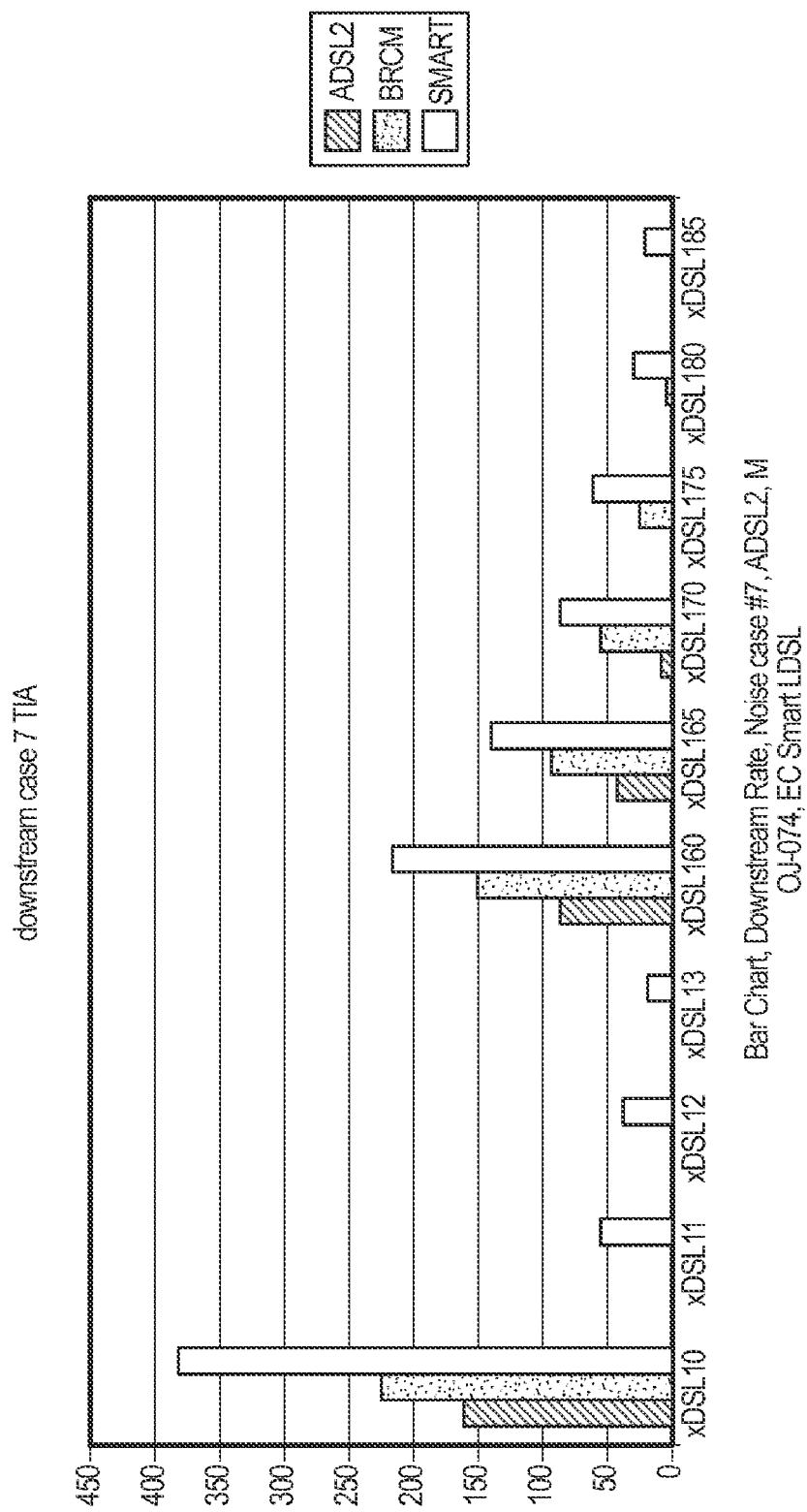
FIG. 34 is a bar chart illustrating downstream rate, noise case #7, ADSL2, M OJ-074, EC Smart LDSL systems in accordance with embodiments of the invention.
Figure 35:
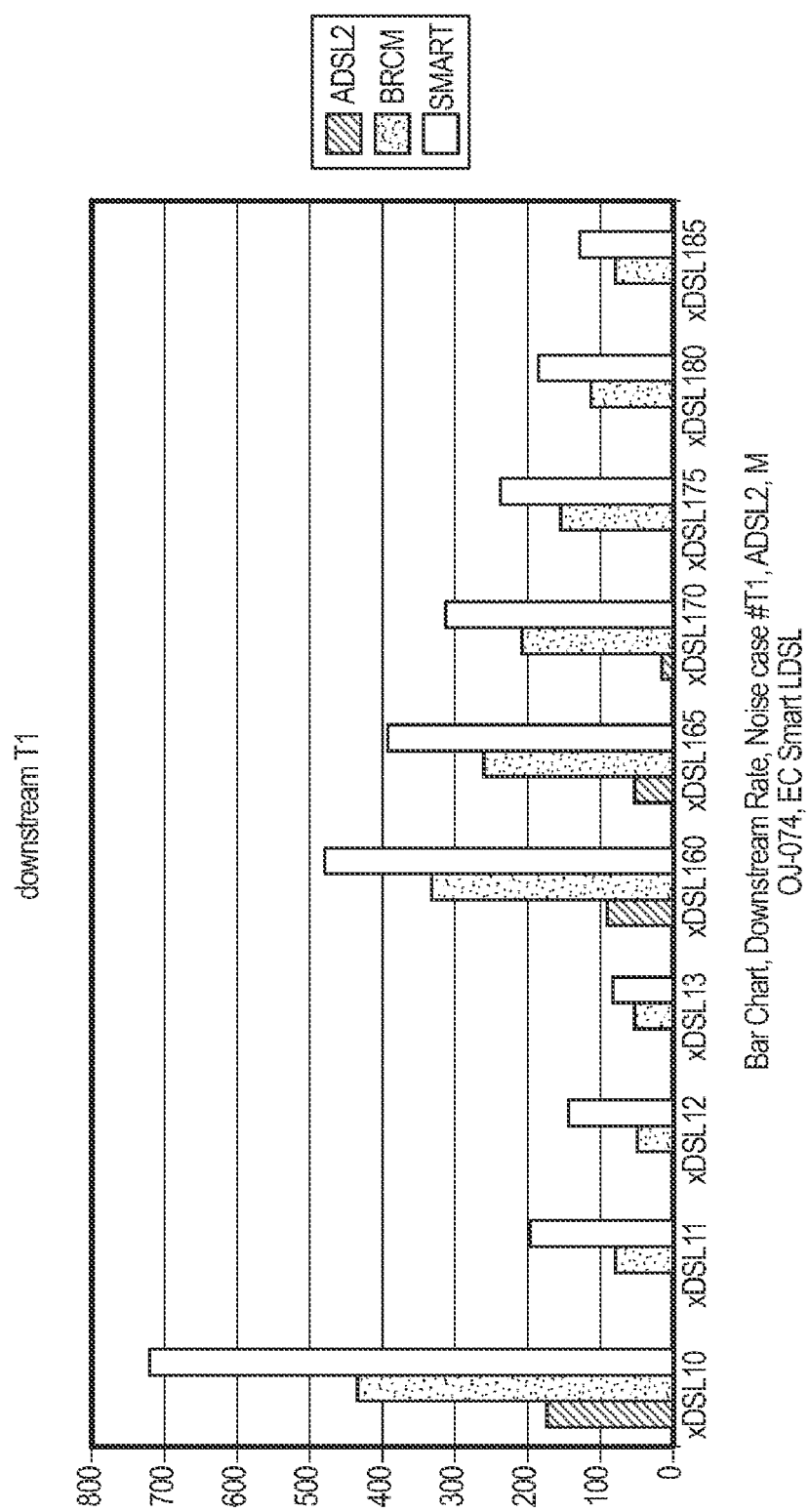
FIG. 35 is a bar chart illustrating downstream rate, noise case #T1, ADSL2, M OJ-074, EC Smart LDSL systems in accordance with embodiments of the invention.

Similarly, tables 5 and 6 give the breakpoints of U3 and D3 PSD Templates (average values) in accordance with some embodiments of the invention. FIG. 3 shows U3 (dashed line) and D3 (solid line) according to some embodiments of the invention.

TABLE 5

U3 Spectrum PSD Template, average values

| Frequency [KHz] | Nominal Upstream PSD [dBm/Hz] |
|---|---|
| 0 | −101.5 |
| 4 | −101.5 |
| 4 | −96 |
| 25.875 | −36.30 |
| 103.5 | −36.30 |
| 164.1 | −99.5 |
| 1221 | −99.5 |

TABLE 5-continued

U3 Spectrum PSD Template, average values

| Frequency [KHz] | Nominal Upstream PSD [dBm/Hz] |
|---|---|
| 1630 | −113.5 |
| 12000 | −113.5 |

TABLE 6

D3 Spectrum PSD Template, average values

| Frequency [kHz] | Nominal Downstream PSD [dBm/Hz] |
|---|---|
| 0 | −101.5 |
| 4 | −101.5 |
| 4 | −96 |
| 80 | −76 |
| 138 | −47.5 |
| 138 | −40 |
| 276 | −37 |
| 552 | −37 |
| 956 | −65.5 |
| 1800 | −65.5 |
| 2290 | −93.5 |
| 3093 | −93.5 |
| 4545 | −113.5 |
| 12000 | −113.5 |

Smart system scenario detection.

In this scenario, it is assumed that the Smart LDSL system has the capability either to analyze a priori the cross talk/physical layer conditions, or to pick up a mask after testing all of them based on performance and spectral compatibility criteria. Under this feature, all the modems located in the same area will detect the same type of cross talk/impairments. Therefore, the worst case catastrophic scenario based on the use of all the possible masks at any location happens to be a completely unrealistic view for a genuine smart system. This feature was incorporated with success in the already deployed smart enhanced Annex C for Japan.

EXAMPLE 1

NON EC Smart LDSL

Definition

In this exemplary embodiment, a first smart system makes use of U1, U2, U3 and D1, D3 masks. According to the features of all these masks, no Echo canceller is required by this embodiment of a smart system that will be identified as NON EC Smart LDSL.

Simulation Results

Tables 7 and 8 gives the ADSL2 upstream and downstream performance for calibration purposes.

TABLE 7

ADSL2 Upstream Channel performance

| | | upstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| ADSL2 | xDSL 10 | 1107 | 1107 | 596 | 294 | 305 | 570 | 646 | 1133 |
| | xDSL 11 | 884 | 884 | 319 | 120 | 130 | 291 | 361 | 894 |
| | xDSL 12 | 846 | 846 | 275 | 90 | 102 | 248 | 314 | 854 |
| | xDSL 13 | 692 | 692 | 142 | 48 | 54 | 99 | 163 | 697 |
| | xDSL 160 | 969 | 969 | 406 | 141 | 157 | 380 | 452 | 986 |
| | xDSL 165 | 925 | 925 | 360 | 116 | 130 | 330 | 404 | 944 |
| | xDSL 170 | 881 | 881 | 313 | 94 | 106 | 287 | 354 | 897 |
| | xDSL 175 | 837 | 837 | 269 | 78 | 89 | 243 | 306 | 851 |
| | xDSL 180 | 798 | 798 | 225 | 63 | 74 | 202 | 266 | 805 |
| | xDSL 185 | 755 | 755 | 185 | 51 | 60 | 162 | 224 | 764 |

TABLE 8

ADSL2 Downstream Channel performance

| | | downstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| ADSL2 | xDSL 10 | 298 | 298 | 305 | 328 | 326 | 307 | 162 | 170 |
| | xDSL 11 | 0 | 0 | 0 | 0 | 0 | 0 | 0 | 0 |
| | xDSL 12 | 0 | 0 | 0 | 0 | 0 | 0 | 0 | 0 |
| | xDSL 13 | 0 | 0 | 0 | 0 | 0 | 0 | 0 | 0 |
| | xDSL 160 | 300 | 300 | 303 | 323 | 321 | 303 | 88 | 91 |
| | xDSL 165 | 201 | 201 | 203 | 224 | 224 | 207 | 43 | 49 |
| | xDSL 170 | 125 | 125 | 113 | 141 | 140 | 123 | 8 | 13 |
| | xDSL 175 | 59 | 66 | 57 | 74 | 74 | 63 | 0 | 0 |
| | xDSL 180 | 0 | 8 | 12 | 17 | 17 | 12 | 0 | 0 |
| | xDSL 185 | 0 | 0 | 0 | 0 | 0 | 0 | 0 | 0 |

Tables 9 and 10 display the results of the Modified OJ-074. These results may be taken as references for LDSL.

TABLE 9

M OJ-074 Upstream Channel Performance Results

| | | upstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| M OJ-074 | xDSL 10 | 839 | 841 | 488 | 300 | 315 | 458 | 510 | 844 |
| | xDSL 11 | 667 | 667 | 312 | 144 | 159 | 283 | 332 | 669 |
| | xDSL 12 | 622 | 623 | 270 | 111 | 124 | 242 | 289 | 624 |
| | xDSL 13 | 496 | 496 | 157 | 59 | 69 | 136 | 176 | 497 |
| | xDSL 160 | 709 | 710 | 353 | 174 | 191 | 324 | 374 | 711 |
| | xDSL 165 | 675 | 675 | 319 | 145 | 161 | 291 | 340 | 677 |
| | xDSL 170 | 641 | 641 | 287 | 120 | 134 | 259 | 307 | 642 |
| | xDSL 175 | 606 | 606 | 255 | 101 | 110 | 227 | 275 | 608 |
| | xDSL 180 | 572 | 572 | 224 | 80 | 92 | 198 | 243 | 573 |
| | xDSL 185 | 537 | 537 | 195 | 66 | 76 | 169 | 212 | 539 |

TABLE 10

M OJ-074 Upstream Channel Performance Results

| | | downstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| M OJ-074 | xDSL 10 | 2396 | 1659 | 1784 | 2023 | 1991 | 1616 | 224 | 436 |
| | xDSL 11 | 997 | 407 | 431 | 861 | 892 | 358 | 0 | 79 |
| | xDSL 12 | 1202 | 643 | 622 | 974 | 969 | 546 | 0 | 48 |
| | xDSL 13 | 855 | 398 | 449 | 696 | 776 | 350 | 0 | 52 |
| | xDSL 160 | 2048 | 1333 | 1413 | 1752 | 1725 | 1268 | 150 | 331 |
| | xDSL 165 | 1788 | 1086 | 1179 | 1527 | 1518 | 1027 | 92 | 261 |
| | xDSL 170 | 1553 | 875 | 933 | 1326 | 1332 | 809 | 53 | 205 |
| | xDSL 175 | 1343 | 754 | 755 | 1145 | 1163 | 648 | 25 | 152 |
| | xDSL 180 | 1147 | 633 | 694 | 985 | 1011 | 579 | 4 | 111 |
| | xDSL 185 | 978 | 529 | 608 | 840 | 872 | 500 | 0 | 76 |

Tables 11 and 12 give the results of NON EC Smart LDSL system.

TABLE 11

NON EC Smart LDSL Upstream Channel Performance Results

| | | upstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| NON EC SMART | xDSL 10 | 839 | 841 | 488 | 310 | 324 | 458 | 510 | 851 |
| | xDSL 11 | 667 | 667 | 312 | 179 | 196 | 283 | 332 | 673 |
| | xDSL 12 | 622 | 623 | 270 | 146 | 157 | 242 | 289 | 628 |
| | xDSL 13 | 496 | 496 | 176 | 102 | 110 | 142 | 176 | 500 |
| | xDSL 160 | 709 | 710 | 353 | 206 | 219 | 324 | 374 | 716 |
| | xDSL 165 | 675 | 675 | 319 | 182 | 195 | 291 | 340 | 681 |
| | xDSL 170 | 641 | 641 | 287 | 152 | 168 | 259 | 307 | 646 |
| | xDSL 175 | 606 | 606 | 255 | 136 | 145 | 227 | 275 | 611 |
| | xDSL 180 | 572 | 572 | 226 | 122 | 130 | 198 | 243 | 577 |
| | xDSL 185 | 537 | 537 | 200 | 108 | 116 | 169 | 212 | 542 |

TABLE 12

NON EC Smart LDSL Downstream Channel Performance Results

| | | downstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| NON EC SMART | xDSL 10 | 2615 | 1711 | 1946 | 2148 | 2169 | 1679 | 224 | 572 |
| | xDSL 11 | 1060 | 407 | 445 | 902 | 958 | 358 | 0 | 135 |
| | xDSL 12 | 1265 | 643 | 634 | 998 | 1025 | 546 | 0 | 105 |
| | xDSL 13 | 885 | 398 | 449 | 705 | 816 | 350 | 0 | 79 |
| | xDSL 160 | 2156 | 1333 | 1466 | 1797 | 1816 | 1268 | 150 | 429 |
| | xDSL 165 | 1885 | 1086 | 1222 | 1572 | 1604 | 1027 | 92 | 349 |
| | xDSL 170 | 1639 | 875 | 967 | 1370 | 1413 | 809 | 53 | 278 |
| | xDSL 175 | 1418 | 754 | 782 | 1187 | 1237 | 648 | 25 | 220 |
| | xDSL 180 | 1213 | 633 | 720 | 1025 | 1079 | 579 | 4 | 169 |
| | xDSL 185 | 1034 | 529 | 629 | 877 | 932 | 500 | 0 | 126 |

Tables 13 and 14 give the selected Upstream and Downstream masks by the smart system. These tables confirm that, for this embodiment, a single mask can't handle all the noise scenarios and all the loops.

TABLE 13

NON EC Smart LDSL: Upstream Selection Table

| | | Upstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| selection index | xDSL 10 | 3 | 3 | 3 | 2 | 2 | 3 | 3 | 3 |
| | xDSL 11 | 3 | 3 | 3 | 2 | 2 | 3 | 3 | 3 |
| | xDSL 12 | 3 | 3 | 3 | 1 | 2 | 3 | 3 | 3 |
| | xDSL 13 | 3 | 3 | 2 | 1 | 1 | 2 | 2 | 3 |
| | xDSL 160 | 3 | 3 | 3 | 2 | 2 | 3 | 3 | 3 |
| | xDSL 165 | 3 | 3 | 3 | 2 | 2 | 3 | 3 | 3 |
| | xDSL 170 | 3 | 3 | 3 | 2 | 2 | 3 | 3 | 3 |
| | xDSL 175 | 3 | 3 | 3 | 1 | 1 | 3 | 3 | 3 |
| | xDSL 180 | 3 | 3 | 2 | 1 | 1 | 3 | 3 | 3 |
| | xDSL 185 | 3 | 3 | 2 | 1 | 1 | 3 | 3 | 3 |

1 = ends at ~60 KHz,
2 = ends at ~86 KHz,
3 = ends at ~103 KHz

TABLE 14

NON EC Smart LDSL: Downstream Selection Table

| | | Downstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| selection index | xDSL 10 | 1 | 1 | 1 | 1 | 1 | 1 | 2 | 1 |
| | xDSL 11 | 1 | 2 | 1 | 1 | 1 | 2 | 1 | 1 |
| | xDSL 12 | 1 | 2 | 1 | 1 | 1 | 2 | 1 | 1 |
| | xDSL 13 | 1 | 2 | 2 | 1 | 1 | 2 | 1 | 1 |
| | xDSL 160 | 1 | 2 | 1 | 1 | 1 | 2 | 2 | 1 |
| | xDSL 165 | 1 | 2 | 1 | 1 | 1 | 2 | 2 | 1 |
| | xDSL 170 | 1 | 2 | 1 | 1 | 1 | 2 | 2 | 1 |
| | xDSL 175 | 1 | 2 | 1 | 1 | 1 | 2 | 2 | 1 |
| | xDSL 180 | 1 | 2 | 1 | 1 | 1 | 2 | 2 | 1 |
| | xDSL 185 | 1 | 2 | 1 | 1 | 1 | 2 | 1 | 1 |

1 = starts at ~120 KHz;
2 = starts at ~138 KHz

Tables 15 and 16 provide the performance improvement inherent to the NON EC Smart LDSL versus M OJ-074. As can be seen from the tables, this embodiment of a smart system performs better than the system disclosed in M OJ-074. This embodiment of a smart system compensates for the M OJ-074 Upstream channel weaknesses in the presence of SHDSL and HDSL.

TABLE 15

(NON EC SMART LDSL US rate - M OJ074 US rate) upstream difference with M OJ-074

| case 1 Self Next | case 2 ADSL | case 3 ISDN | case 4 SHDSL | case 5 HDSL | case 6 MIX | case 7 TIA | T1 |
|---|---|---|---|---|---|---|---|
| 0 | 0 | 0 | 10 | 9 | 0 | 0 | 7 |
| 0 | 0 | 0 | 35 | 37 | 0 | 0 | 4 |
| 0 | 0 | 0 | 35 | 33 | 0 | 0 | 4 |
| 0 | 0 | 19 | 43 | 41 | 6 | 0 | 3 |
| 0 | 0 | 0 | 32 | 28 | 0 | 0 | 5 |
| 0 | 0 | 0 | 37 | 34 | 0 | 0 | 4 |
| 0 | 0 | 0 | 32 | 34 | 0 | 0 | 4 |
| 0 | 0 | 0 | 35 | 35 | 0 | 0 | 3 |
| 0 | 0 | 2 | 42 | 38 | 0 | 0 | 4 |
| 0 | 0 | 5 | 42 | 40 | 0 | 0 | 3 |

TABLE 16

(NON EC SMART LDSL DS rate - M OJ074 DS rate) downstream difference with M OJ-074

| case 1 Self Next | case 2 ADSL | case 3 ISDN | case 4 SHDSL | case 5 HDSL | case 6 MIX | case 7 TIA | T1 |
|---|---|---|---|---|---|---|---|
| 219 | 52 | 162 | 125 | 178 | 63 | 0 | 136 |
| 63 | 0 | 14 | 41 | 66 | 0 | 0 | 56 |
| 63 | 0 | 12 | 24 | 56 | 0 | 0 | 57 |
| 30 | 0 | 0 | 9 | 40 | 0 | 0 | 27 |
| 108 | 0 | 53 | 45 | 91 | 0 | 0 | 98 |
| 97 | 0 | 43 | 45 | 86 | 0 | 0 | 88 |
| 86 | 0 | 34 | 44 | 81 | 0 | 0 | 73 |
| 75 | 0 | 27 | 42 | 74 | 0 | 0 | 68 |
| 66 | 0 | 26 | 40 | 68 | 0 | 0 | 58 |
| 56 | 0 | 21 | 37 | 60 | 0 | 0 | 50 |

FIGS. 4-19 show bar chart performance plots of ADSL2, non-EC smart LDSL and the system disclosed in M OJ-074, for the above described noise cases.

EC Smart LDSL System

Definition

As described above, a first exemplary smart system may make use of U1, U2, U3 and D1, D2, D3. In accordance with the features of all these masks, an Echo canceller may be advantageous when D2 is used. A second exemplary smart system may be identified as the EC Smart LDSL. For this embodiment, the Smart LDSL system may have the capability to analyze a priori the cross talk/physical layer conditions for all the Smart LDSL modems located in the same area. In addition the system may detect the same type of cross talks/impairments and, therefore, the worst case self NEXT due to the Downstream mask D2 may only apply when this mask is used.

EC Smart LDSL: Simulation results

TABLE 17

EC Smart LDSL Upstream Channel Performance Results

| | | upstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC SMART LDSL | xDSL 10 | 839 | 841 | 488 | 310 | 324 | 458 | 456 | 423 |
| | xDSL 11 | 667 | 667 | 312 | 179 | 196 | 283 | 280 | 253 |
| | xDSL 12 | 622 | 623 | 270 | 146 | 157 | 242 | 239 | 214 |
| | xDSL 13 | 496 | 496 | 176 | 102 | 110 | 142 | 135 | 130 |
| | xDSL 160 | 709 | 710 | 353 | 206 | 219 | 324 | 321 | 291 |
| | xDSL 165 | 675 | 675 | 319 | 182 | 195 | 291 | 288 | 259 |
| | xDSL 170 | 641 | 641 | 287 | 152 | 168 | 259 | 256 | 229 |
| | xDSL 175 | 606 | 606 | 255 | 136 | 145 | 227 | 225 | 200 |
| | xDSL 180 | 572 | 572 | 226 | 122 | 130 | 198 | 195 | 168 |
| | xDSL 185 | 537 | 537 | 200 | 108 | 116 | 169 | 166 | 139 |

TABLE 18

EC Smart LDSL Downstream Channel Performance Results

| | | Downstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC SMART LDSL | xDSL 10 | 2615 | 1711 | 1946 | 2148 | 2169 | 1679 | 381 | 719 |
| | xDSL 11 | 1060 | 407 | 445 | 902 | 958 | 358 | 54 | 193 |
| | xDSL 12 | 1265 | 643 | 634 | 998 | 1025 | 546 | 38 | 140 |
| | xDSL 13 | 885 | 398 | 449 | 705 | 816 | 350 | 18 | 80 |
| | xDSL 160 | 2156 | 1333 | 1466 | 1797 | 1816 | 1268 | 216 | 476 |
| | xDSL 165 | 1885 | 1086 | 1222 | 1572 | 1604 | 1027 | 140 | 388 |
| | xDSL 170 | 1639 | 875 | 967 | 1370 | 1413 | 809 | 86 | 308 |
| | xDSL 175 | 1418 | 754 | 782 | 1187 | 1237 | 648 | 62 | 237 |
| | xDSL 180 | 1213 | 633 | 720 | 1025 | 1079 | 579 | 28 | 181 |
| | xDSL 185 | 1034 | 529 | 629 | 877 | 932 | 500 | 20 | 127 |

TABLE 19

EC Smart LDSL: Upstream Selection Table

| | | Upstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC SMART LDSL | xDSL 10 | 3 | 3 | 3 | 2 | 2 | 3 | 3 | 3 |
| | xDSL 11 | 3 | 3 | 3 | 2 | 2 | 3 | 3 | 3 |
| | xDSL 12 | 3 | 3 | 3 | 1 | 2 | 3 | 3 | 3 |
| | xDSL 13 | 3 | 3 | 2 | 1 | 1 | 2 | 2 | 1 |
| | xDSL 160 | 3 | 3 | 3 | 2 | 2 | 3 | 3 | 3 |
| | xDSL 165 | 3 | 3 | 3 | 2 | 2 | 3 | 3 | 3 |
| | xDSL 170 | 3 | 3 | 3 | 2 | 2 | 3 | 3 | 3 |
| | xDSL 175 | 3 | 3 | 3 | 1 | 1 | 3 | 3 | 3 |
| | xDSL 180 | 3 | 3 | 2 | 1 | 1 | 3 | 3 | 2 |
| | xDSL 185 | 3 | 3 | 2 | 1 | 1 | 3 | 3 | 2 |

1 = ends at ~60 KHz,
2 = ends at ~86 KHz,
3 = ends at ~103 KHz

TABLE 20

EC Smart LDSL: Downstream Selection Table

| | | Downstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC SMART LDSL | xDSL 10 | 2 | 2 | 2 | 2 | 2 | 2 | 1 | 1 |
| | xDSL 11 | 2 | 3 | 2 | 2 | 2 | 3 | 1 | 1 |
| | xDSL 12 | 2 | 3 | 2 | 2 | 2 | 3 | 1 | 1 |
| | xDSL 13 | 2 | 3 | 3 | 2 | 2 | 3 | 1 | 1 |
| | xDSL 160 | 2 | 3 | 2 | 2 | 2 | 3 | 1 | 1 |
| | xDSL 165 | 2 | 3 | 2 | 2 | 2 | 3 | 1 | 1 |
| | xDSL 170 | 2 | 3 | 2 | 2 | 2 | 3 | 1 | 1 |
| | xDSL 175 | 2 | 3 | 2 | 2 | 2 | 3 | 1 | 1 |
| | xDSL 180 | 2 | 3 | 2 | 2 | 2 | 3 | 1 | 1 |
| | xDSL 185 | 2 | 3 | 2 | 2 | 2 | 3 | 1 | 1 |

1 = starts at ~120 KHz;
2 = starts at ~138 KHz

TABLE 21

(EC SMART LDSL US rate - M OJ074 US rate)
upstream difference with M OJ-074

| case 1 Self Next | case 2 ADSL | case 3 ISDN | case 4 SHDSL | case 5 HDSL | case 6 MIX | case 7 TIA | T1 |
|---|---|---|---|---|---|---|---|
| 0 | 0 | 0 | 10 | 9 | 0 | −54 | −421 |
| 0 | 0 | 0 | 35 | 37 | 0 | −52 | −416 |
| 0 | 0 | 0 | 35 | 33 | 0 | −50 | −410 |
| 0 | 0 | 19 | 43 | 41 | 6 | −41 | −367 |
| 0 | 0 | 0 | 32 | 28 | 0 | −53 | −420 |
| 0 | 0 | 0 | 37 | 34 | 0 | −52 | −418 |
| 0 | 0 | 0 | 32 | 34 | 0 | −51 | −413 |
| 0 | 0 | 0 | 35 | 35 | 0 | −50 | −408 |
| 0 | 0 | 2 | 42 | 38 | 0 | −48 | −405 |
| 0 | 0 | 5 | 42 | 40 | 0 | −46 | −400 |

TABLE 22

(EC SMART LDSL DS rate - M OJ074 DS rate)
downstream difference with M OJ-074

| case 1 Self Next | case 2 ADSL | case 3 ISDN | case 4 SHDSL | case 5 HDSL | case 6 MIX | case 7 TIA | T1 |
|---|---|---|---|---|---|---|---|
| 219 | 52 | 162 | 125 | 178 | 63 | 157 | 283 |
| 63 | 0 | 14 | 41 | 66 | 0 | 54 | 114 |
| 63 | 0 | 12 | 24 | 56 | 0 | 38 | 92 |
| 30 | 0 | 0 | 9 | 40 | 0 | 18 | 28 |
| 108 | 0 | 53 | 45 | 91 | 0 | 66 | 145 |
| 97 | 0 | 43 | 45 | 86 | 0 | 48 | 127 |
| 86 | 0 | 34 | 44 | 81 | 0 | 33 | 103 |
| 75 | 0 | 27 | 42 | 74 | 0 | 37 | 85 |
| 66 | 0 | 26 | 40 | 68 | 0 | 24 | 70 |
| 56 | 0 | 21 | 37 | 60 | 0 | 20 | 51 |

FIGS. 20-35 show bar chart performance plots of ADSL2, EC smart LDSL and the system disclosed in M OJ-074, for the above described noise cases.

Smart DSL Implementation based on ITU-T Recommendation G.992.3

Two Steps

Deciding to access one of the mask amongst all the possible choices offered by a smart DSL platform may be facilitated by using a two step process in the following order:

(1) Masks Choice based on Performance/Physical layer status criterion: Smart functionality; and (2) Protocol to activate one particular mask based on CP/CO capabilities.

Step (1): Mask Choice based on Performance/Physical layer Status: Smart Functionality.

Figure 36:
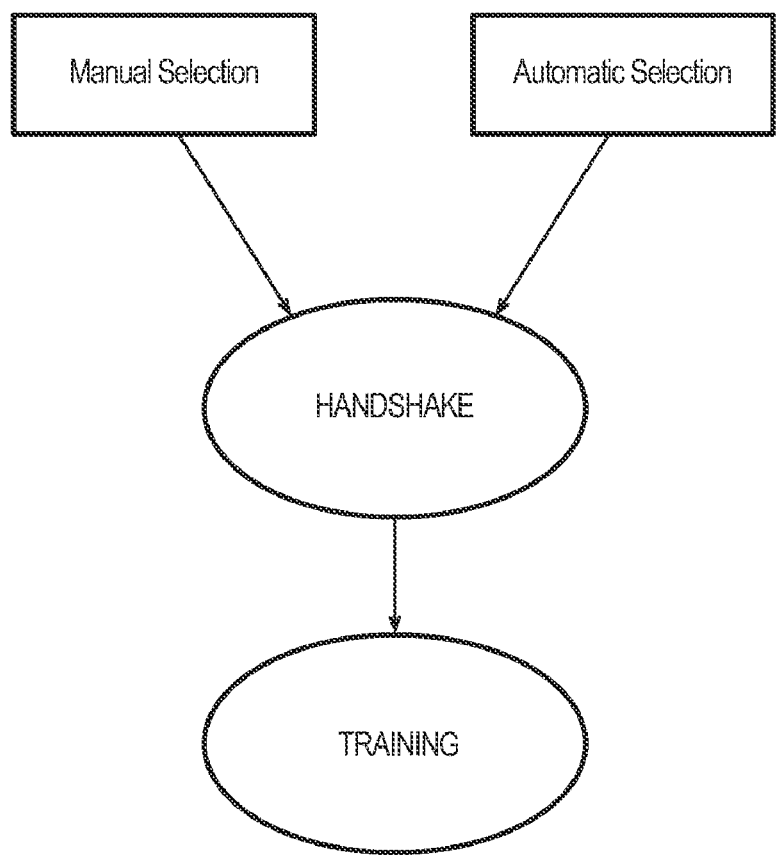
FIG. 36 illustrates a flow diagram for selecting a pair of masks in a smart DSL system in accordance with embodiments of the invention.

FIG. 36 displays the organizational chart that describes the two selection modes inherent to smart DSL: manual or automatic.

Figure 37:
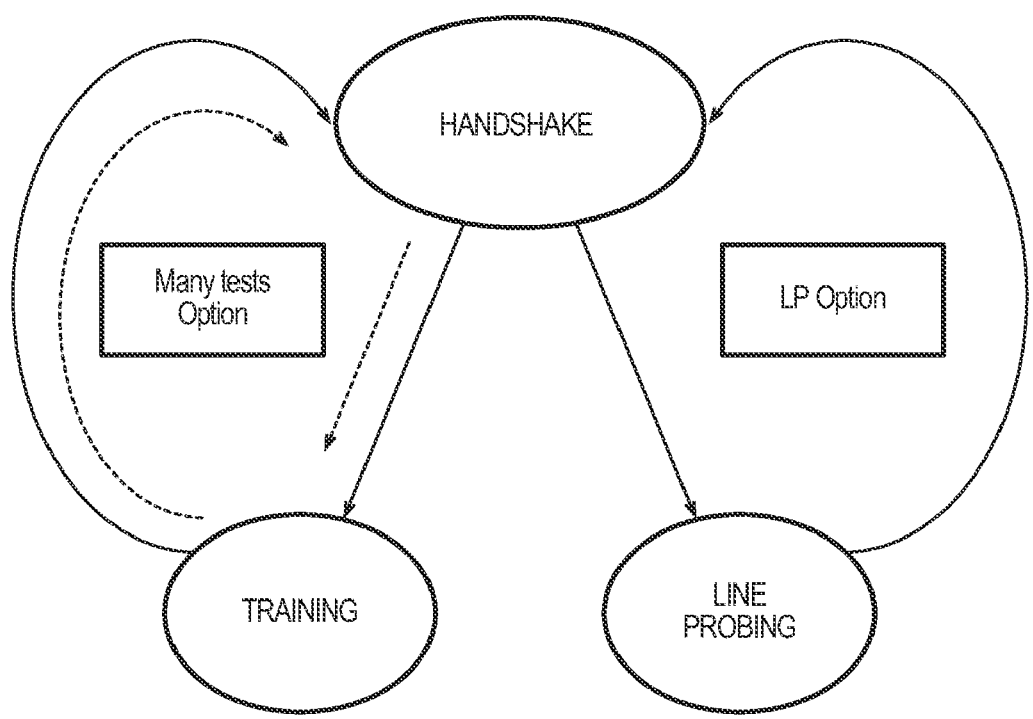
FIG. 37 is a state diagram illustrating options for selecting a pair of masks in a smart DSL systems in accordance with embodiments of the invention.

The automatic selection may be completed in two different ways: by making use of the Line Probing capabilities of G.992.3 (LP Option) or by trying different masks up to the training and choosing at the end the best (Many Tests Option). FIG. 37 gives the state diagram of the two approaches to automatically select a pair of mask for a smart DSL platform.

The LP option needs to complete the right loop of operations in FIG. 37 one time only. The Many tests option requires to complete the left loop of operations in FIG. 37 as many times as the number of available possibilities.

Step 2: Protocol to activate one mask based on CO/CP capabilities.

This section discloses three protocol examples to activate one mask based on CO/CP capabilities.

Option 1: CP Decides

Figure 38:
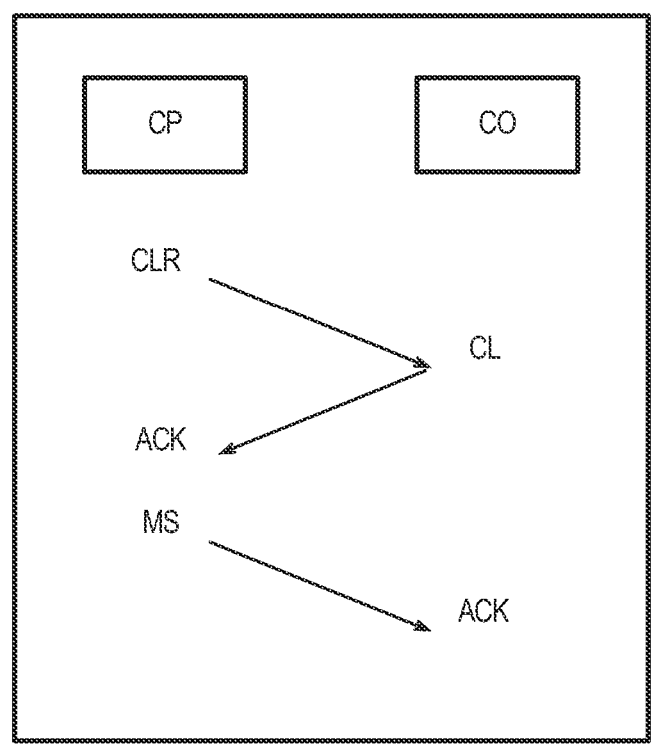
FIG. 38 illustrates an option for implementing smart DSL systems in accordance with embodiments of the invention.

FIG. 38 describes the "CP decides" which mask is to be used sequence, based on G.992.3. CLR and CL allow CP and CO to signify their list of capabilities.

Option 2: CO Decides

Figure 39:
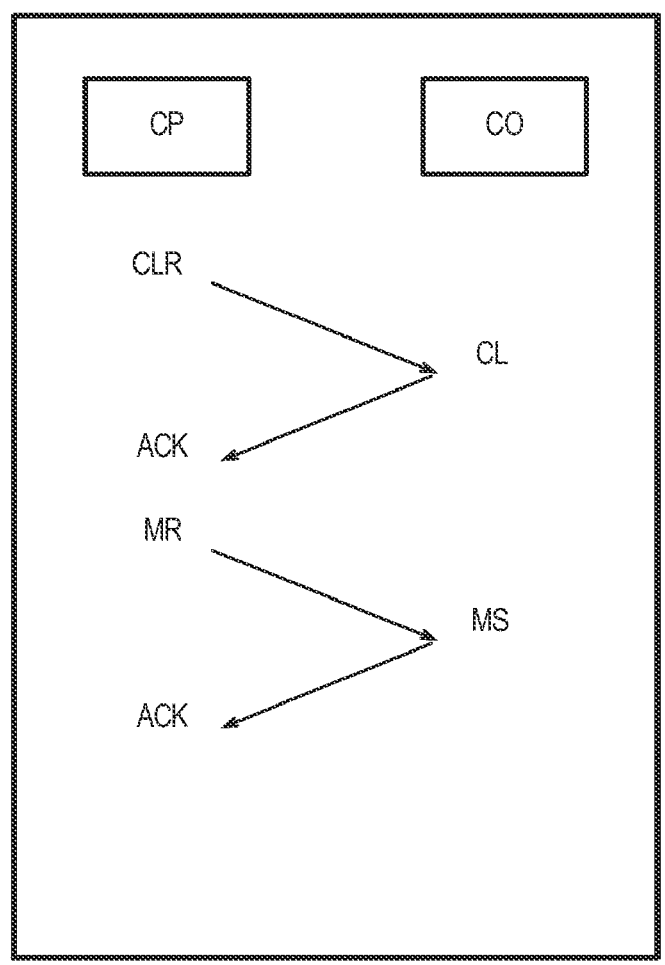
FIG. 39 illustrates an option for implementing smart DSL systems in accordance with embodiments of the invention.

FIG. 39 describes the "CO decides" which mask is to be used sequence, based on G.992.3, after being requested by the CP to do so. CLR and CL allow CP and CO to signify their list of capabilities.

Option 3: CP is Overruled by CO

Figure 40:
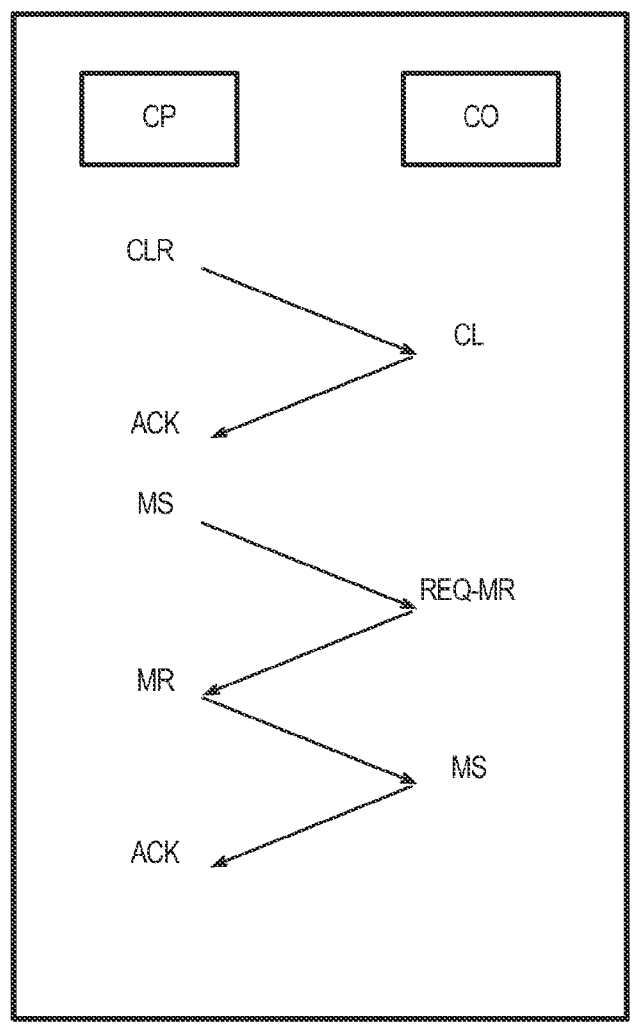
FIG. 40 illustrates an option for implementing smart DSL systems in accordance with embodiments of the invention.

FIG. 40 describes the "CO overrules CP" about which mask is to be used sequence, based on G.992.3, after CP has mentioned which mask is to be used. CLR and CL allow CP and CO to signify their list of capabilities.

Figure 42:
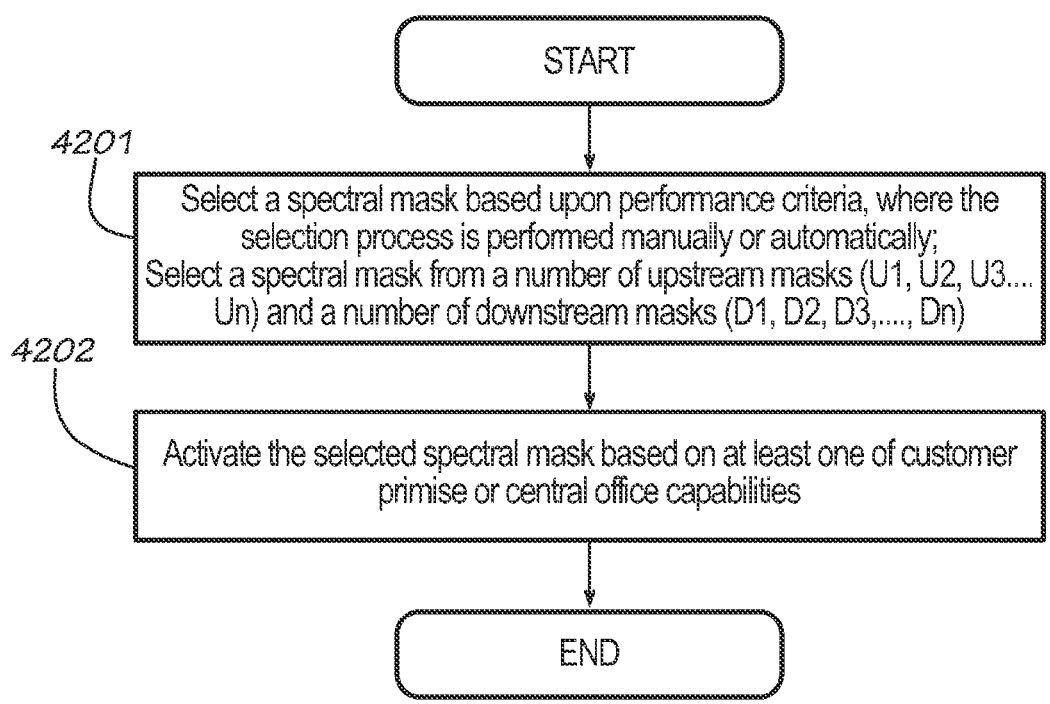
FIG. 42 illustrates a flow diagram for implementing smart DSL systems in accordance with another embodiment.

FIG. 42 illustrates a flow diagram for implementing smart DSL systems in accordance with some embodiments. Although the flowchart of FIG. 42 shows a specific order of execution, it should be appreciated that the order of execution may differ from that which is depicted. Beginning with block 4201, a spectral mask is selected based upon performance criteria. The selection process may be performed manually or automatically. For some embodiments, selecting a spectral mask further comprises selecting a spectral mask from a number of upstream masks (U1, U2, U3 , . . . , Un) and a number of downstream masks (D1, D2, D3, . . . , Dn). In block 4202, the selected spectral mask is activated based on at least one of customer premise or central office capabilities. It should also be emphasized that the above-described embodiment is merely an example of one possible implementation. Other variations and modifications may be made to the above-described embodiment.

What is claimed is:

1. A method for implementing smart digital subscriber line (DSL) for long reach digital subscriber line (LDSL) systems, the method comprising:
    selecting a spectral mask by one of a central office and customer premise equipment (CPE) based upon performance criteria, wherein selecting a spectral mask further comprises selecting a spectral mask from a number of upstream masks (U1, U2, U3, . . . , Un) and a number of downstream masks (D1, D2, D3, . . . , Dn), wherein one of the number of upstream masks is defined by the following relations, wherein f is a frequency band in kHz and U1 is the value of the mask in dBm/Hz:
        for $0<f\leq 4$, then U1=−97.5, with max power in the in 0-4 kHz band of +15 dBm;
        for $4<f\leq 25.875$, then U1=−92.5+23.43×$\log_2$(f/4);
        for $25.875<f\leq 60.375$, then U1=−29.0;
        for $60.375<f\leq 90.5$, then U1=−34.5−95×$\log_2$(f/60.375);
        for $90.5<f\leq f1221$, then U1=−90;
        for $1221<f\leq 1630$, then U1=−99.5 peak, with max power in the [f, f +1 MHz] window of (−90−48×$\log_2$(f/1221)+60) dBm; and
        for $1630<f\leq 11040$, then U1=−99.5 peak, with max power in the [f, f+1 MHz] window of −50 dBm; and
    activating the selected spectral mask based on at least one of customer premise or central office capabilities.

2. The method of claim 1 wherein selecting the spectral mask is performed manually.

3. The method of claim 1 wherein selecting the spectral mask is performed automatically.

4. The method of claim 3 wherein automatic selection of the spectral mask is performed by line probing.

5. The method of claim 3 wherein automatic selection of the spectral mask is performed by a many tests procedure performed during a training period.

6. The method of claim 1 wherein activating the selected spectral mask is accomplished by a customer premises equipment decision.

7. The method of claim 1 wherein activating the selected spectral mask is accomplished by a central office decision.

8. The method of claim 1 wherein activating the selected spectral mask is accomplished by a central office decision that overrules a customer premises decision.

9. The method of claim 1 wherein one of the number of downstream masks is defined by the following relations, wherein f is a frequency band in kHz and D1 is the value of the mask in dBm/Hz:
    for $0<f\leq 4$, then D1=−97.5, with max power in the in 0-4 kHz band of +15 dBm;
    for $4<f\leq 25.875$, then D1=−92.5+20.79×$\log_2$(f/4);
    for $25.875<f\leq 81$, then D1=−36.5;
    for $81<f\leq 92.1$, then D1=−36.5−70×$\log_2$(f/81);
    for $92.1<f\leq 121.4$, then D1=−49.5;
    for $121.4<f\leq 138$, then D1=−49.5+70×$\log_2$(f/121.4);
    for $138<f\leq 353.625$, then D1=−36.5+0.0139×(f−138);
    for $353.625<f\leq 569.25$, then D1=−33.5;
    for $569.25<f\leq 1622.5$, then D1=−33.5−36×$\log_2$(f/569.25);
    for $1622.5<f\leq 3093$, then D1=−90;
    for $3093<f\leq 4545$, then D1=−90 peak, with maximum power in the [f, f+1 MHz] window of (−36.5−36×$\log_2$(f/1104)+60)dBm; and
    for $4545<f\leq 11040$, then D1=−90 peak, with maximum power in the [f, f+1 MHz] window of −50 dBm.

10. The method of claim 1 wherein one of the number of upstream masks is defined by the following relations, wherein f is a frequency band in kHz and U2 is the value of the mask in dBm/Hz:
    for $0<f\leq 4$, then U2=−97.5, with max power in the in 0-4 kHz band of +15 dBm;
    for $4<f\leq 25.875$, then U2=−92.5−22.5×$\log_2$(f/4);
    for $25.875<f\leq 86.25$, then U2=−30.9;
    for $86.25<f\leq 138.6$, then U2=−34.5−95×$\log_2$ (f/86.25);
    for $138.6<f\leq 1221$, then U2=−99.5;
    for $1221<f\leq 1630$, then U2=−99.5 peak, with max power in the [f, f+1 MHz] window of (−90−48×$\log_2$(f/1221)+60) dBm; and
    for $1630<f\leq 11040$, then U2=−99.5 peak, with max power in the [f, f+1 MHz] window of −50 dBm.

11. The method of claim 1 wherein one of the number of downstream masks is defined by the following peak values, wherein f is a frequency in kHz and D2 is the peak value of the mask in dBm/Hz:
    for f=0.0, then D2=−98.0;
    for f=3.99, then D2=−98.00;
    for f=4.0, then D2=−92.5;
    for f=80.0, then D2=−72.5;
    for f=120.74, then D2=−47.50;
    for f=120.75, then D2=−37.80;
    for f=138.0, then D2=−36.8;
    for f=276.0, then D2=−33.5;
    for f=677.0625, then D2=−33.5;
    for f=956.0, then D2=−62.0;
    for f=1800.0, then D2=−62.0;
    for f=2290.0, then D2=−90.0;
    for f=3093.0, then D2=−90.0;
    for f=4545.0, then D2=−110.0; and
    for f=12000.0, then D2=−110.0.

12. The method of claim 1 wherein one of the number of upstream masks is defined by the following peak values, wherein f is a frequency in kHz and U3 is the peak value of the mask in dBm/Hz:
    for f=0, then U3=−101.5;
    for f=4, then U3=−101.5;
    for f=4, then U3=−96;
    for f=25.875, then U3=−36.30;
    for f=103.5, then U3=−36.30;
    for f=164.1, then U3=−99.5;
    for f=1221, then U3=−99.5;
    for f=1630, then U3=−113.5; and
    for f=12000, then U3=−113.5.

13. The method of claim 1 wherein one of the number of downstream masks is defined by the following peak values, wherein f is a frequency in kHz and D3 is the peak value of the mask in dBm/Hz:
    for f=0, then D3=−101.5;
    for f=4, then D3=−101.5;
    for f=4, then D3=−96;
    for f=80, then D3=−76;
    for f=138, then D3=−47.5;
    for f=138, then D3=−40;
    for f=276, then D3=−37;
    for f=552, then D3=−37;
    for f=956, then D3=−65.5;
    for f=1800, then D3=−65.5;
    for f=2290, then D3=−93.5;
    for f=3093, then D3=−93.5;
    for f=4545, then D3=−113.5; and
    for f=12000, then D3=−113.5.

* * * * *